(12) United States Patent
Nakashio

(10) Patent No.: US 12,086,479 B2
(45) Date of Patent: Sep. 10, 2024

(54) APPARATUS AND METHOD FOR CONTROLLING THE SAME

(71) Applicant: CANON KABUSHIKI KAISHA, Tokyo (JP)

(72) Inventor: Hidekazu Nakashio, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/350,968

(22) Filed: Jun. 17, 2021

(65) Prior Publication Data

US 2021/0397387 A1 Dec. 23, 2021

(30) Foreign Application Priority Data

Jun. 23, 2020 (JP) .................................. 2020-108209

(51) Int. Cl.
*G06F 3/12* (2006.01)
*H04N 1/60* (2006.01)

(52) U.S. Cl.
CPC .......... *G06F 3/1208* (2013.01); *G06F 3/1253* (2013.01); *H04N 1/603* (2013.01)

(58) Field of Classification Search
CPC .... G06F 3/1208; G06F 3/1253; G06F 3/1285; H04N 1/603; H04N 1/6088
See application file for complete search history.

(56) References Cited

U.S. PATENT DOCUMENTS

| | | | | |
|---|---|---|---|---|
| 8,818,084 B2* | 8/2014 | Shimbaru | ............... | H04N 9/735 382/162 |
| 2002/0039103 A1* | 4/2002 | Kumada | ................... | G09G 5/02 345/593 |
| 2003/0117639 A1* | 6/2003 | Milton | ................. | H04N 1/6097 358/1.9 |
| 2004/0212819 A1* | 10/2004 | Nishimura | ............ | G06F 3/1219 358/1.16 |
| 2006/0048286 A1* | 3/2006 | Donato | ............ | G08B 13/19634 348/E7.086 |
| 2007/0086009 A1* | 4/2007 | Ehbets | ....................... | G01J 3/50 356/402 |
| 2008/0137137 A1* | 6/2008 | Yamada | ................. | H04N 1/603 358/1.15 |
| 2011/0013210 A1* | 1/2011 | Yamaguchi | .......... | H04N 1/6097 358/1.9 |
| 2011/0096343 A1* | 4/2011 | Martinez | ................ | H04N 1/603 358/1.9 |

(Continued)

FOREIGN PATENT DOCUMENTS

JP 2002218266 A 8/2002

*Primary Examiner* — Akwasi M Sarpong
*Assistant Examiner* — Michael L Burleson
(74) *Attorney, Agent, or Firm* — Canon U.S.A., Inc. IP Division

(57) ABSTRACT

An apparatus includes a print controller configured to perform color conversion on data using a color profile to generate image data for use in printing. The apparatus further includes a controller configured to acquire information regarding characteristic information of at least one illumination apparatus via a network, acquire first characteristic information based on the information regarding the characteristic information of the at least one illumination apparatus, acquire second characteristic information based on a color chart of the apparatus, and generate a color profile based on the first and second characteristic information.

20 Claims, 20 Drawing Sheets

(56) References Cited

U.S. PATENT DOCUMENTS

| | | | |
|---|---|---|---|
| 2011/0145037 A1* | 6/2011 | Domashchenko | G06Q 10/10 |
| | | | 705/7.27 |
| 2012/0218572 A1* | 8/2012 | Kishino | H04N 1/6066 |
| | | | 358/1.9 |
| 2015/0115834 A1* | 4/2015 | Cho | H05B 47/19 |
| | | | 315/294 |
| 2018/0124902 A1* | 5/2018 | Thijssen | H04Q 9/00 |
| 2019/0250095 A1* | 8/2019 | Borges | G01N 21/25 |
| 2020/0389559 A1* | 12/2020 | Yamamura | H04N 1/00037 |

\* cited by examiner

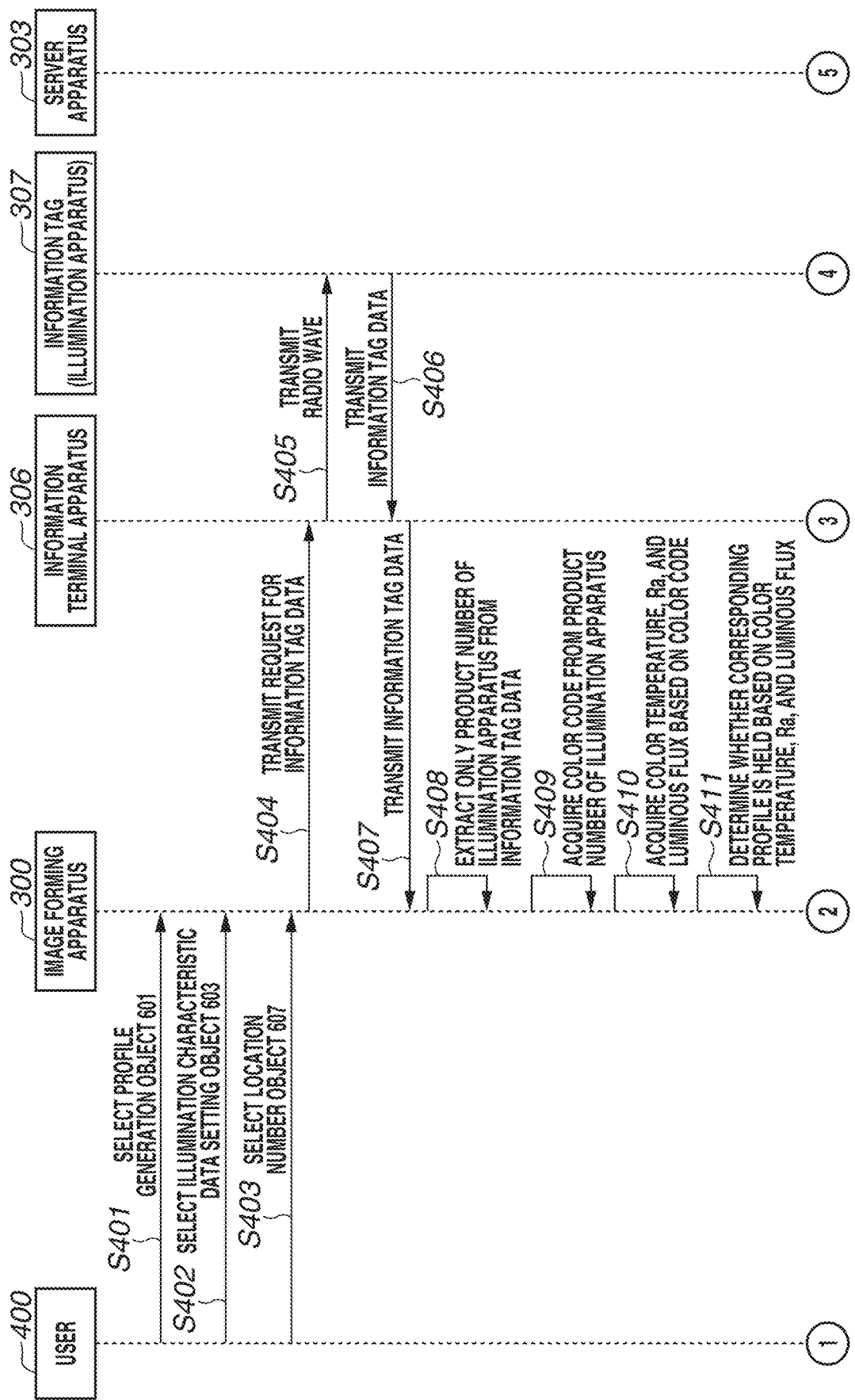

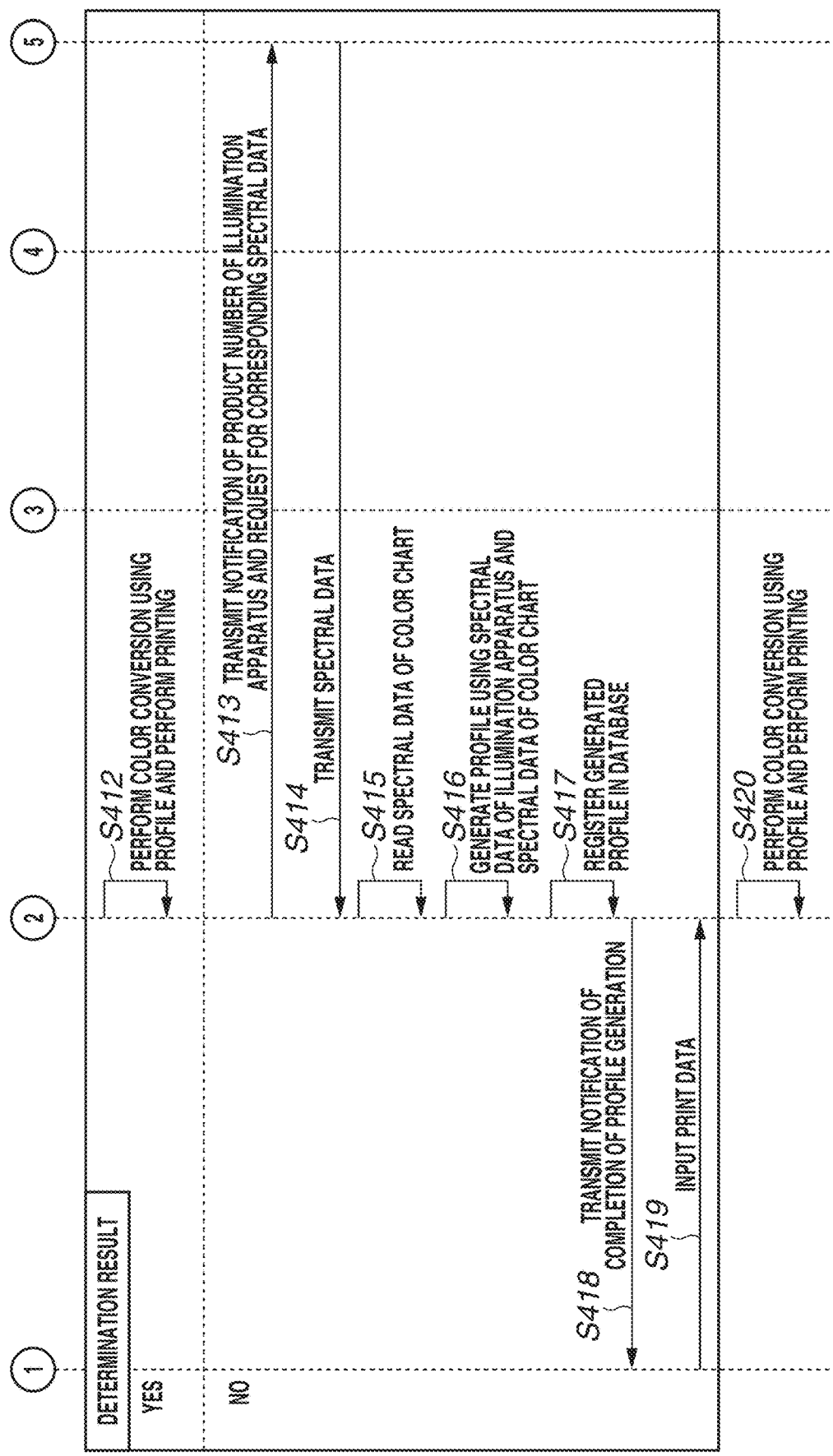

FIG.7C

< PROFILE SETTING >

· PROFILE LIST

| REGISTRATION DATE | PROFILE NAME | CORRELATED COLOR TEMPERATURE (K) | AVERAGE COLOR RENDERING INDEX (Ra) | LUMINOUS FLUX (lm) |
|---|---|---|---|---|
| 2012/02/21 12:34 | ROOM 101 PROFILE | 3000 | 88 | 3560 |
| 2010/01/01 11:00 | ROOM 201 PROFILE | 2940 | 84 | 1070 |
| 2009/05/01 01:00 | ROOM 301 PROFILE | 6500 | 74 | 2700 |
| ... | ... | ... | ... | ... |
| 2009/05/01 01:00 | MAIN CONFERENCE ROOM PROFILE | 3000 | 95 | 1730 |

~606

[ RETURN ]   [ OK ]

FIG.7D

< ILLUMINATION CHARACTERISTICS SETTING >

· ROOM LIST

[ 1F ] [ 2F ] [ 3F ]

| 101 | 102 |
| 103 | 104 |

~607

[ RETURN ]   [ OK ]

FIG.7E

< PRINTER CHARACTERISTICS SETTING >

· SELECT PAPER TYPE

608 —
| PLAIN PAPER |
| THICK PAPER |
| ... |
| COATED PAPER |

[ RETURN ]     [ OK ]

FIG.7F

< INPUT OF ILLUMINATION PRODUCT NUMBER >

· ACQUISITION OF PRODUCT NUMBER OF ILLUMINATION APPARATUS HAS FAILED DUE TO COMMUNICATION ERROR. PLEASE INPUT PRODUCT NUMBER OF ILLUMINATION APPARATUS.

[ INPUT OF ILLUMINATION PRODUCT NUMBER ]

[ RETURN ]     [ OK ]

FIG.7G

< INPUT OF ILLUMINATION SPECTRAL DATA >

· ACQUISITION OF SPECTRAL DATA OF ILLUMINATION APPARATUS HAS FAILED DUE TO COMMUNICATION ERROR. DO YOU WANT TO INPUT SPECTRAL DATA OF ILLUMINATION APPARATUS?

YES    NO

RETURN    OK

FIG.7H

< USE OF ALTERNATIVE PROFILE >

· ACQUISITION OF SPECTRAL DATA OF ILLUMINATION APPARATUS HAS FAILED DUE TO COMMUNICATION ERROR. DO YOU WANT TO PRINT USING PROFILE FOR CLOSEST ILLUMINATION CHARACTERISTICS?

YES    NO

RETURN    OK

FIG.8

FLR40SD/M/36
‾‾ ‾‾ ‾ ‾ ‾ ‾‾
701  702 703 704  705  706

FIG.9

| WAVELENGTH | | COLOR TEMPERATURE | COLOR CODE | TYPICAL CHARACTERISTIC VALUES OF COMMERCIAL FLUORESCENT LAMP | | |
|---|---|---|---|---|---|---|
| | | | | CORRELATED COLOR TEMPERATURE (K) | AVERAGE COLOR RENDERING INDEX (Ra) | LUMINOUS FLUX (lm) |
| THREE-WAVELENGTH TYPE | | INCANDESCENT | EX-L | 3000 | 88 | 3560 |
| | | WARM WHITE | EX-WW | 3500 | 88 | 3200 |
| | | WHITE | EX-W | 4000 | 88 | 3200 |
| | | NATURAL WHITE | EX-N | 5000 | 88 | 3560 |
| | | DAYLIGHT | EX-D | 6700 | 88 | 3360 |
| HIGH COLOR RENDERING TYPE | AAA | INCANDESCENT | L-EDL | 3000 | 95 | 1730 |
| | | NATURAL WHITE | N-EDL | 5000 | 99 | 2250 |
| | | DAYLIGHT | D-EDL | 6500 | 98 | 1800 |
| | AA | INCANDESCENT | W-SDL | 4500 | 91 | 1980 |
| | | NATURAL WHITE | N-SDL | 5000 | 92 | 1980 |
| | | DAYLIGHT | D-SDL | 6500 | 94 | 1950 |
| NORMAL TYPE | | INCANDESCENT | LE | 2940 | 84 | 1070 |
| | | WARM WHITE | WW | 3450 | 60 | 3010 |
| | | WHITE | W | 4150 | 61 | 3100 |
| | | NATURAL WHITE | N | 5000 | 72 | 2950 |
| | | DAYLIGHT | D | 6500 | 74 | 2700 |

FIG.10

| REGISTRATION DATE | PROFILE NAME | CORRELATED COLOR TEMPERATURE (K) | AVERAGE COLOR RENDERING INDEX (Ra) | LUMINOUS FLUX (lm) |
|---|---|---|---|---|
| 2012/02/21 12:34 | ROOM 101 PROFILE | 3000 | 88 | 3560 |
| 2010/01/01 11:00 | ROOM 201 PROFILE | 2940 | 84 | 1070 |
| 2009/05/01 01:00 | ROOM 301 PROFILE | 6500 | 74 | 2700 |
| ⋮ | ⋮ | ⋮ | ⋮ | ⋮ |
| 2009/05/01 01:00 | MAIN CONFERENCE ROOM PROFILE | 3000 | 95 | 1730 |

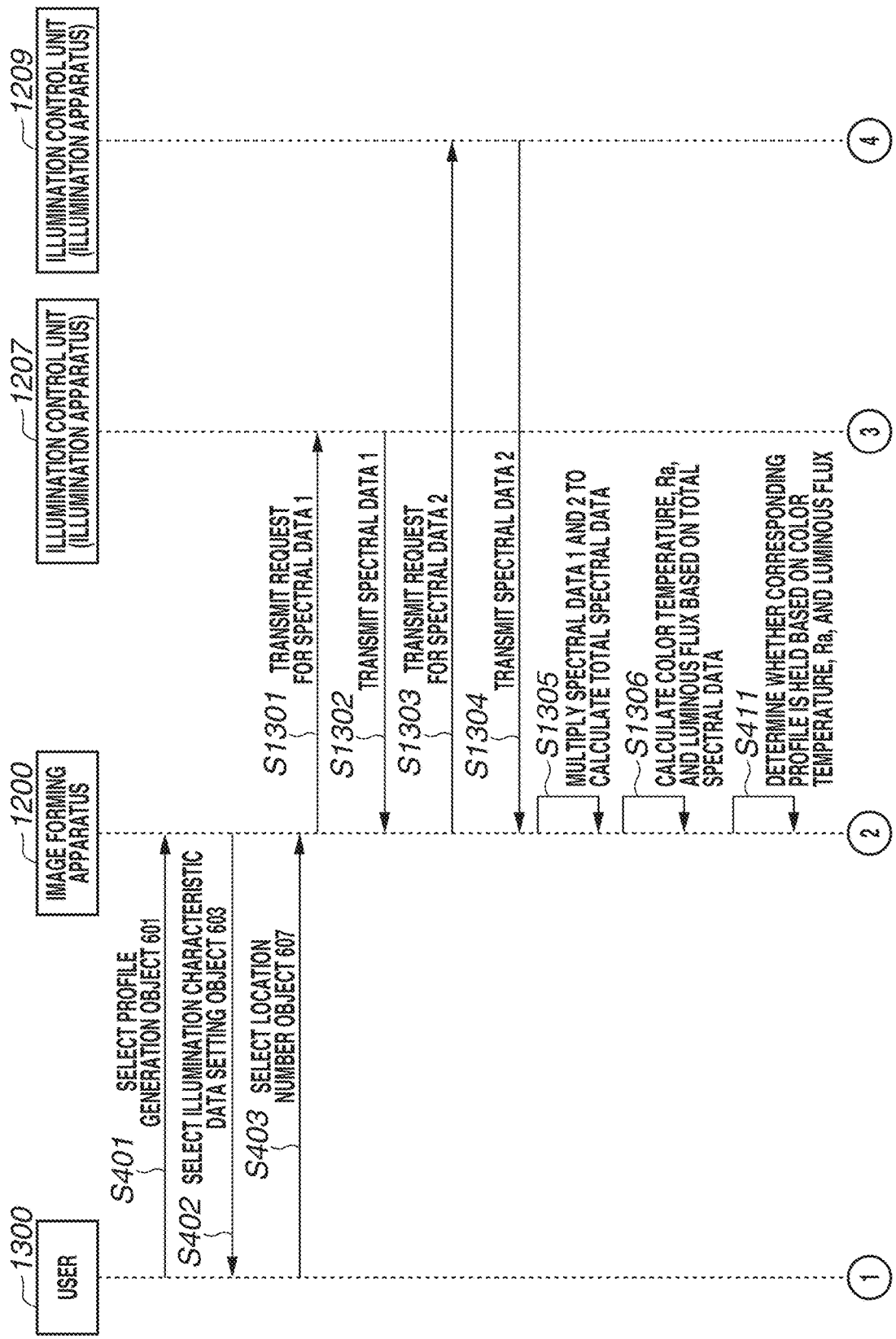

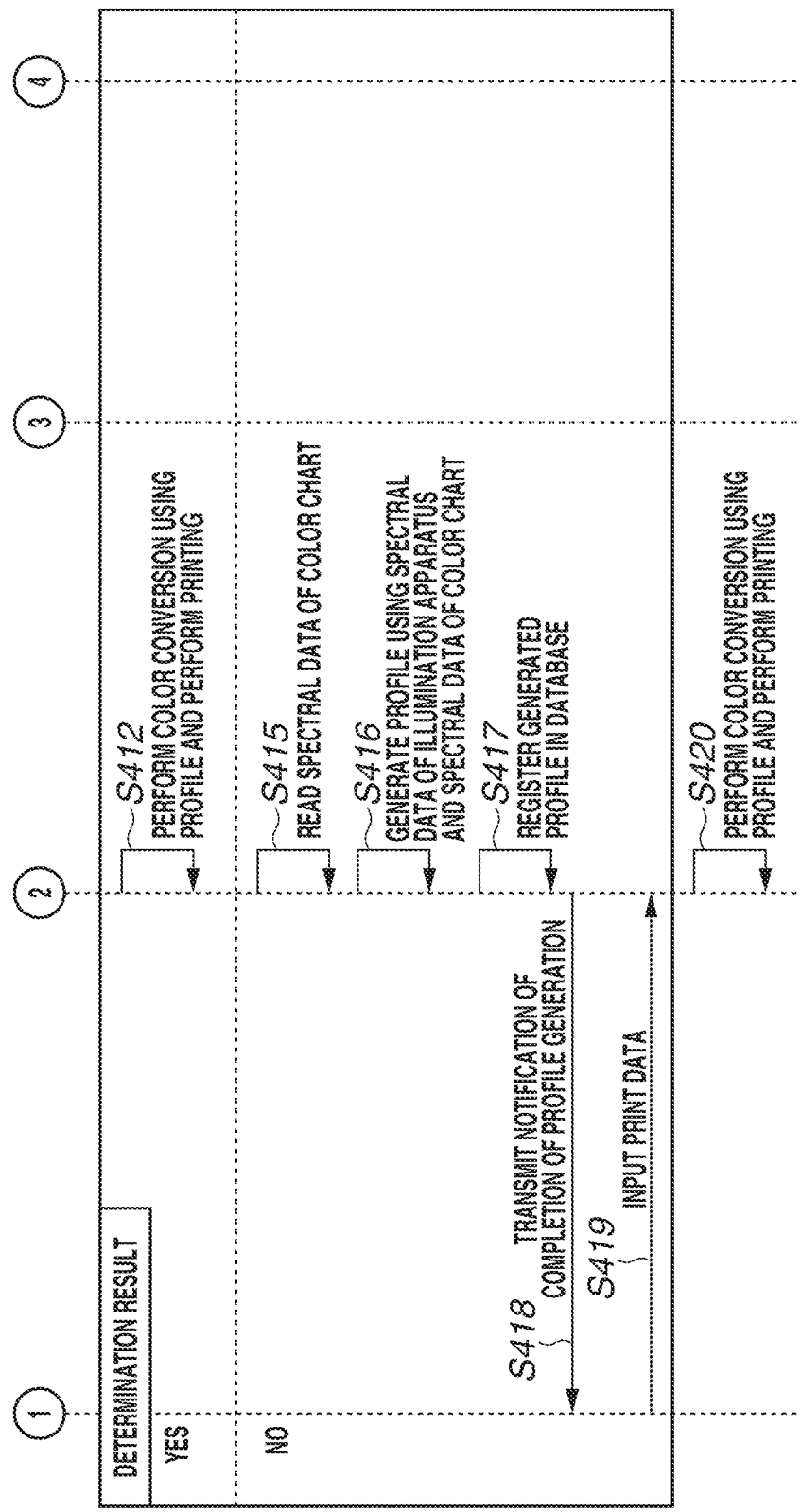

APPARATUS AND METHOD FOR CONTROLLING THE SAME

BACKGROUND OF THE DISCLOSURE

Field of the Disclosure

The aspect of the embodiments relates to an apparatus and a method for controlling the apparatus.

Description of the Related Art

When a poster or an advertisement is created for a product, a user designs the poster or the advertisement using software for design. With the software for design, the user can designate the arrangement and colors of the background, text, and content. The user then inputs the final design data to an output device, such as a color printer, and prints the poster or the advertisement.

How the colors are perceived, however, varies significantly depending on the observation light source. Thus, the poster or the advertisement, which is designed to have a great appearance on the monitor, may not have the same appearance under a light source at a location where the poster or the advertisement is observed. For example, in a case where the light source at the display location of the poster is a reddish light source such as an incandescent lamp, the poster appears to be reddish. How the poster actually appears may be different from the appearance of the colors intended by the user who created the poster.

Japanese Patent Application Laid-Open No. 2002-218266 discusses a technique in which spectral data of a color chart output from a target printer and spectral data of an observation light source are measured by a measurement device. Then, a color profile is generated using the spectral data of the color chart and the spectral data of the observation light source, and the generated color profile is applied to color conversion, thereby providing an ambient light correction function capable of performing color conversion suitable for a display location. In this method, a dedicated measurement device is used for the user to measure the spectral data of the observation light source.

Meanwhile, the Internet of Things (IoT) for connecting various devices to the Internet to exchange information has been developed in recent years. Installing a predetermined application into a computer enables the computer to use IoT devices. There are a wide variety types of IoT devices including various types of sensors and things. Various types of pieces of information are acquired from the IoT devices spread across a predetermined area and the acquired information is analyzed, so that the information can be utilized in various services. An apparatus configured to collect information from the IoT devices can collect information directly from the IoT devices or via an information processing apparatus.

SUMMARY OF THE DISCLOSURE

According to an aspect of the embodiments, an apparatus includes a print controller configured to perform color conversion on data using a color profile to generate image data for use in printing. The apparatus further includes a controller having one or more processors which executes instructions stored in one or more memories, the controller being configured to acquire information regarding characteristic information of at least one illumination apparatus via a network, acquire first characteristic information based on the information regarding the characteristic information of the at least one illumination apparatus, acquire second characteristic information based on a color chart of the apparatus, and generate a color profile based on the first and second characteristic information.

Further features of the disclosure will become apparent from the following description of exemplary embodiments with reference to the attached drawings.

BRIEF DESCRIPTION OF THE DRAWINGS

FIGS. 6A and 6B illustrate a diagram illustrating ambient light correction processing according to the first exemplary embodiment.

FIGS. 7A to 7H are diagrams each illustrating an example of a screen displayed on a display unit according to the first exemplary embodiment.

FIG. 8 is a diagram illustrating an example of a product number of an illumination apparatus.

FIG. 9 is a diagram illustrating an example of a correspondence table between illumination apparatus product numbers and typical characteristic values.

FIG. 10 is a diagram illustrating an example of a color profile list.

FIGS. 15A and 15B illustrate a diagram illustrating ambient light correction processing according to the second exemplary embodiment.

DESCRIPTION OF THE EMBODIMENTS

Exemplary embodiments of the disclosure will be described in detail below with reference to the attached drawings. The exemplary embodiments described below are not intended to limit the scope of the disclosure and not all combinations of features described in the exemplary embodiments are essential to a technical solution of the disclosure. In the exemplary embodiments, an image processing system will be described as an example of an information processing system and a mobile apparatus will be described as an example of an information processing apparatus.

Figure 1:
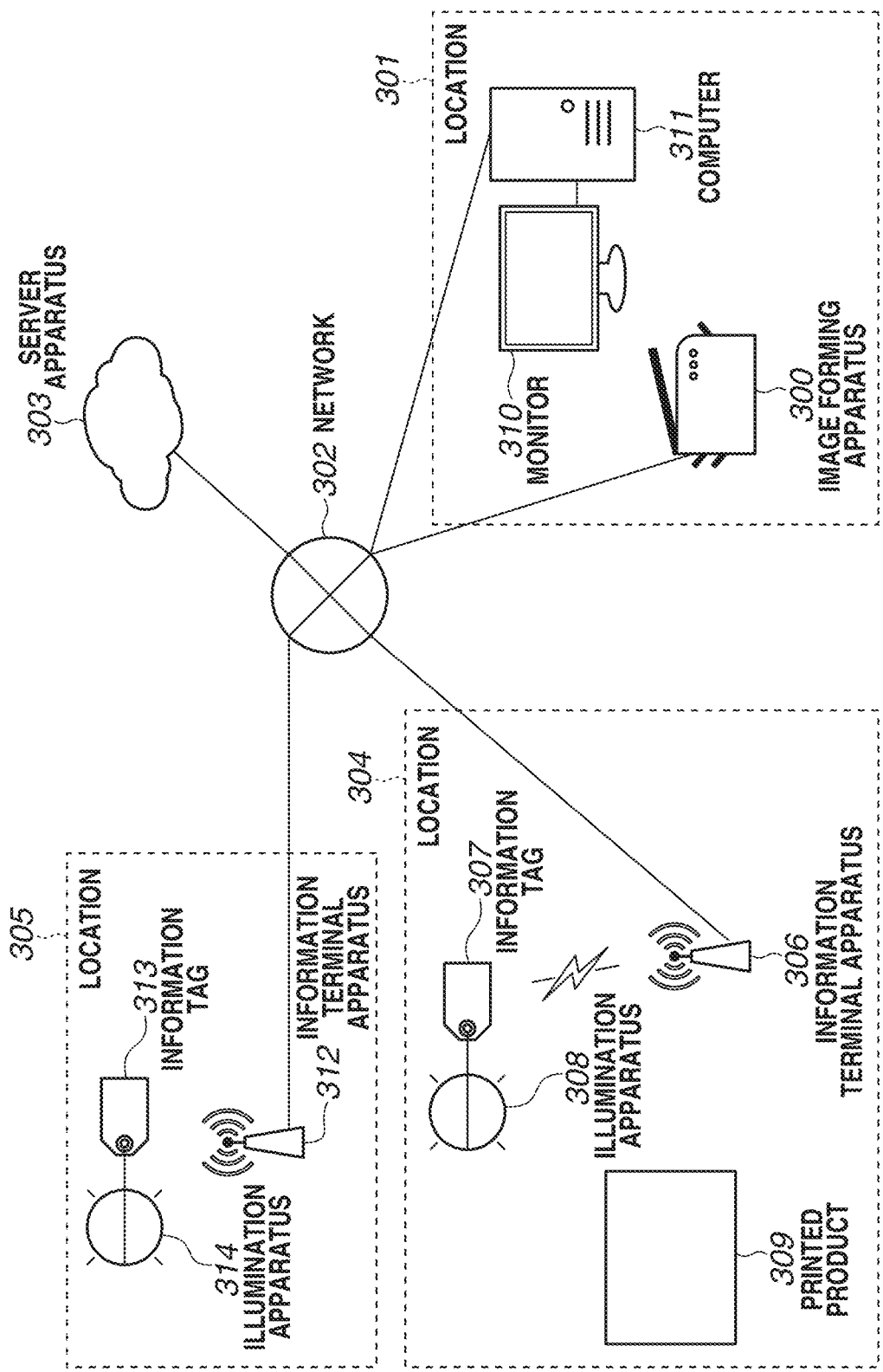
FIG. 1 is a block diagram illustrating an entire configuration of a network system according to a first exemplary embodiment.

FIG. 1 is a conceptual diagram illustrating an entire configuration of a network system according to a first exemplary embodiment. The network system according to the present exemplary embodiment includes a location 301, a network 302, a server apparatus 303, a location 304, and a location 305. The location 301 according to the present exemplary embodiment includes an image forming apparatus 300, a monitor 310, and a computer 311.

The location 304 according to the present exemplary embodiment includes an information terminal apparatus 306, an information tag 307, an illumination apparatus 308, and a printed product 309. The location 305 includes an information terminal apparatus 312, an information tag 313, and an illumination apparatus 314. While the configuration including three locations (the locations 301, 304, and 305) is described as the configuration of the network system according to the present exemplary embodiment, the configuration is not limited thereto. For example, the location 301 for printing the printed product 309 and the location 304 for displaying the printed product 309 can be the same, or the configuration can include more locations.

The configuration will be described in more detail. The location 301 is where the user prints the printed product 309 using the image forming apparatus 300. The network 302 is, for example, a local area network (LAN), the Internet, or an intranet, and can be wired or wireless.

The server apparatus 303 is, for example, the cloud and provides computer resources and data as services via a network such as the Internet. In the present exemplary embodiment, the server apparatus 303 holds spectral data of various types of illumination apparatuses and the related characteristic data (correlated color temperature, average color rendering index, luminous flux).

Figure 2:
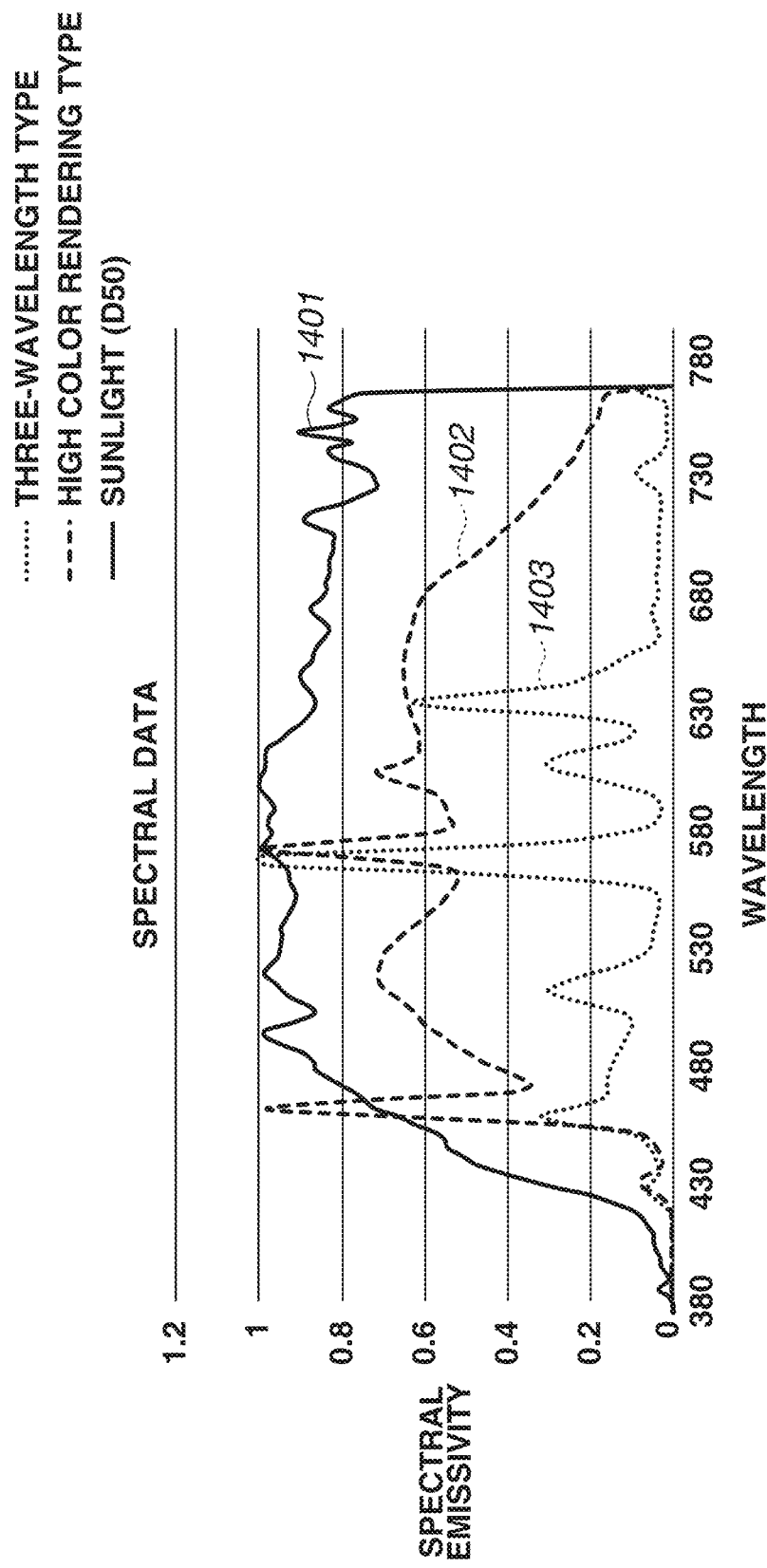
FIG. 2 is a diagram illustrating an example of spectral data of an illumination apparatus

As illustrated in FIG. 2, in the spectral data, light is separated into wavelength components (on the horizontal axis) and the respective amounts of the wavelength components are shown (on the vertical axis). The correlated color temperature is a measure that represents the color of light by a quantitative numerical value (K, Kelvin). Lower color temperatures represent darker orange colors, and higher color temperatures represent more bluish white colors.

The average color rendering index is a quantitative numerical value (Ra) representing a characteristic of a light source that influences how the color of an object is perceived when the light source illuminates the object. In general, the average color rendering index of a light source closer to natural light is determined as "good" or "excellent", and the average color rendering index of a light source farther from natural light is determined as "bad" or "inferior" with respect to natural light as a reference. The luminous flux is a physical quantity (lm, lumen) representing the brightness of light passing through a surface.

The server apparatus 303 is assumed to be installed by each illumination apparatus manufacturer so that the spectral data of the illumination apparatuses is used in the other communicable terminals. The server apparatus 303 holds the spectral data corresponding to the product number of each of the illumination apparatuses. The location 304 is the display location of the printed product 309. In the present exemplary embodiment, the location 304 is a target location for ambient light correction. In the present exemplary embodiment, the location 305 is not a target location for ambient light correction, and is different from the locations 301 and 304.

The image forming apparatus 300 at the location 301 is, for example, a digital copy machine or an electrophotographic color or monochrome image forming apparatus such as a laser printer or a facsimile with a separate scanner. The monitor 310 and the computer 311 are connected to the image forming apparatus 300 to serve as a host apparatus of the image forming apparatus 300. More specifically, the computer 311 holds page description language (PDL) data for printing and inputs the data to the image forming apparatus 300 via the network 302 so that an image displayed on the monitor 310 is printed by the image forming apparatus 300.

The information terminal apparatus 306 at the location 304 is a transmission device that wiredly or wirelessly transmits information to the image forming apparatus 300 via the network 302. The information terminal apparatus 306 is also a reception device that wiredly or wirelessly receives information from the image forming apparatus 300 via the network 302. Examples of the communication standard (method) include Wi-Fi® communication and the fifth generation communication system (5G). The information terminal apparatus 306 also transmits and receives information to and from the information tag 307. Examples of the communication standard (method) include infrared communication, visible light communication, and short-range wireless communication (e.g., near-field communication (NFC)).

For short-range wireless communication, Felica®, Bluetooth®, or radio-frequency identifier (RFID) is used. In the present exemplary embodiment, a case where RFID is used will be described. RFID is a system in which an "RFID tag" containing electronic information (e.g., name, price, production date) is attached to a product or food, and the electronic information is read by a "reader/writer" that is a reading/writing apparatus.

In the present exemplary embodiment, the information terminal apparatus 306 refers to an RFID reader/writer. The information tag 307 refers to an RFID tag. The RFID tag is a storage medium with a built-in memory, and electronic information can be written to, erased from, or rewritten to the RFID tag using radio waves (a type of electromagnetic waves). The RFID tag is also referred to as an integrated circuit (IC) tag. The illumination apparatus 308 is, for example, an incandescent lamp, a fluorescent lamp, or a light emitting diode (LED), and emits various types of light (artificial light). The printed product 309 is produced by printing an image, such as text, a painting, or a picture, on a medium, such as paper, with toner or ink using the image forming apparatus 300.

The information terminal apparatus 312 at the location 305 is similar to the information terminal apparatus 306. The information tag 313 is similar to the information tag 307. The illumination apparatus 314 is similar to the illumination apparatus 308.

[Configuration of Image Forming Apparatus]

Figure 3:
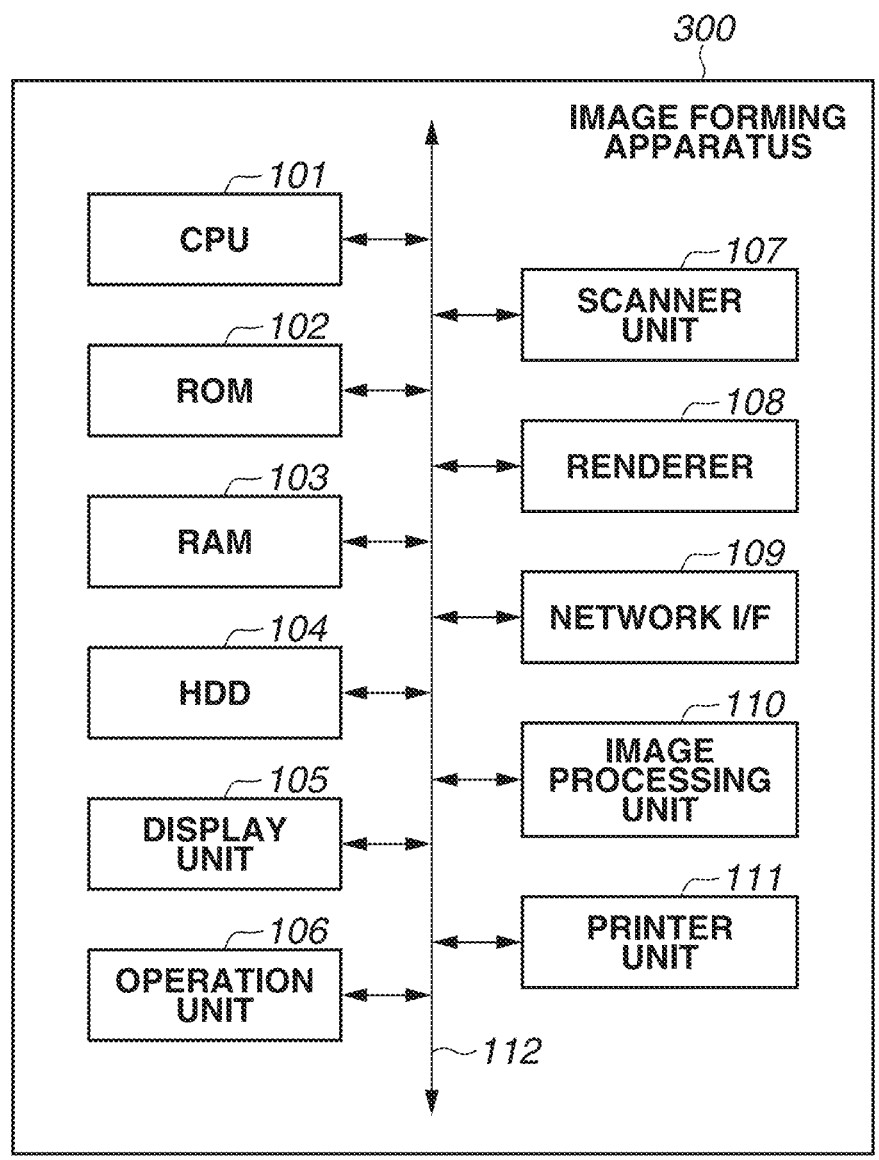
FIG. 3 is a block diagram illustrating a configuration of an image forming apparatus according to the first exemplary embodiment.

FIG. 3 is a block diagram illustrating a configuration of the image forming apparatus 300 according to the present exemplary embodiment. The image forming apparatus 300 includes a central processing unit (CPU) 101, a read-only memory (ROM) 102, a random access memory (RAM) 103, a hard disk drive (HDD) 104, a display unit 105, an operation unit 106, and a scanner unit 107. The image forming apparatus 300 further includes a renderer 108, a network interface (I/F) 109, an image processing unit 110, a printer unit 111, and a system bus 112.

The above-described configuration will be described in detail. The CPU 101 controls the entire image forming apparatus 300 and performs calculation processing. The CPU 101 performs various types of image processing (described below) based on programs stored in the ROM 102. The ROM 102 is a storage area for storing a system activation program, programs for controlling the scanner unit 107 and the printer unit 111, text data, and text code information.

The RAM 103 is used when the CPU 101 loads a program or data stored in the ROM 102 and executes the program or the data for each processing. The RAM 103 is also used as a data storage area for image files received from the scanner unit 107 or the network I/F 109.

The HDD 104 includes, for example, a hardware disk and is used to store results of processing performed by the CPU 101, programs, information files, and print images. The HDD 104 is also used as a work area when the CPU 101 performs processing.

The display unit 105 displays a screen using, for example, a liquid crystal and is used to display the setting state of the image forming apparatus 300, the state of processing of each of the components such as the CPU 101, an error state, or the like. The operation unit 106 is used by the user to input various instructions such as a setting change instruction and a reset instruction.

Information about various instructions input via the operation unit 106 is stored in the RAM 103 and is used when the CPU 101 performs processing. The scanner unit 107 irradiates a document with light, converts the light reflected on the document into an electric signal using a charge-coupled device (CCD) image sensor including a red-green-blue (RGB) color filter, and obtains RGB data corresponding to the document via a parallel (or serial) cable.

In a case where the display unit 105 is a touch panel, the display unit 105 serves as the operation unit 106 that receives input of various instructions such as a setting change instruction and a reset instruction. While in the present exemplary embodiment, the display unit 105 and the operation unit 106 are described as separate units, the display unit 105 and the operation unit 106 may be integrated as one operation unit.

The renderer 108 performs color conversion based on intermediate data (display list) generated by an interpreter 201, which will be described below, and generates a raster image (RGB image or CMYK image). The network I/F 109 is used to connect the image forming apparatus 300 to the network 302 illustrated in FIG. 1.

PDL data is input to the image forming apparatus 300 via the network I/F 109 from the computer 311 connected to the network 302 illustrated in FIG. 1. PDL is a language that is used to describe a printer output image and an instruction to the printer (printer unit 111) in order to print text or an image created on the computer 311. An example of the language used to describe an instruction to the printer is PostScript of Adobe Systems.

The image processing unit 110 performs image processing suitable for the printer (printer unit 111), on the image data generated by the renderer 108. The printer unit 111 forms an image of four-type cyan-magenta-yellow-black (CMYK) data processed by the image processing unit 110 on a paper medium by using an electrophotographic process including exposure, latent image formation, development, transfer, and fixing. The system bus 112 connects the above-described components and serves as a data path between the components.

[Configurations of CPU and Image Processing Unit]

Figure 4:
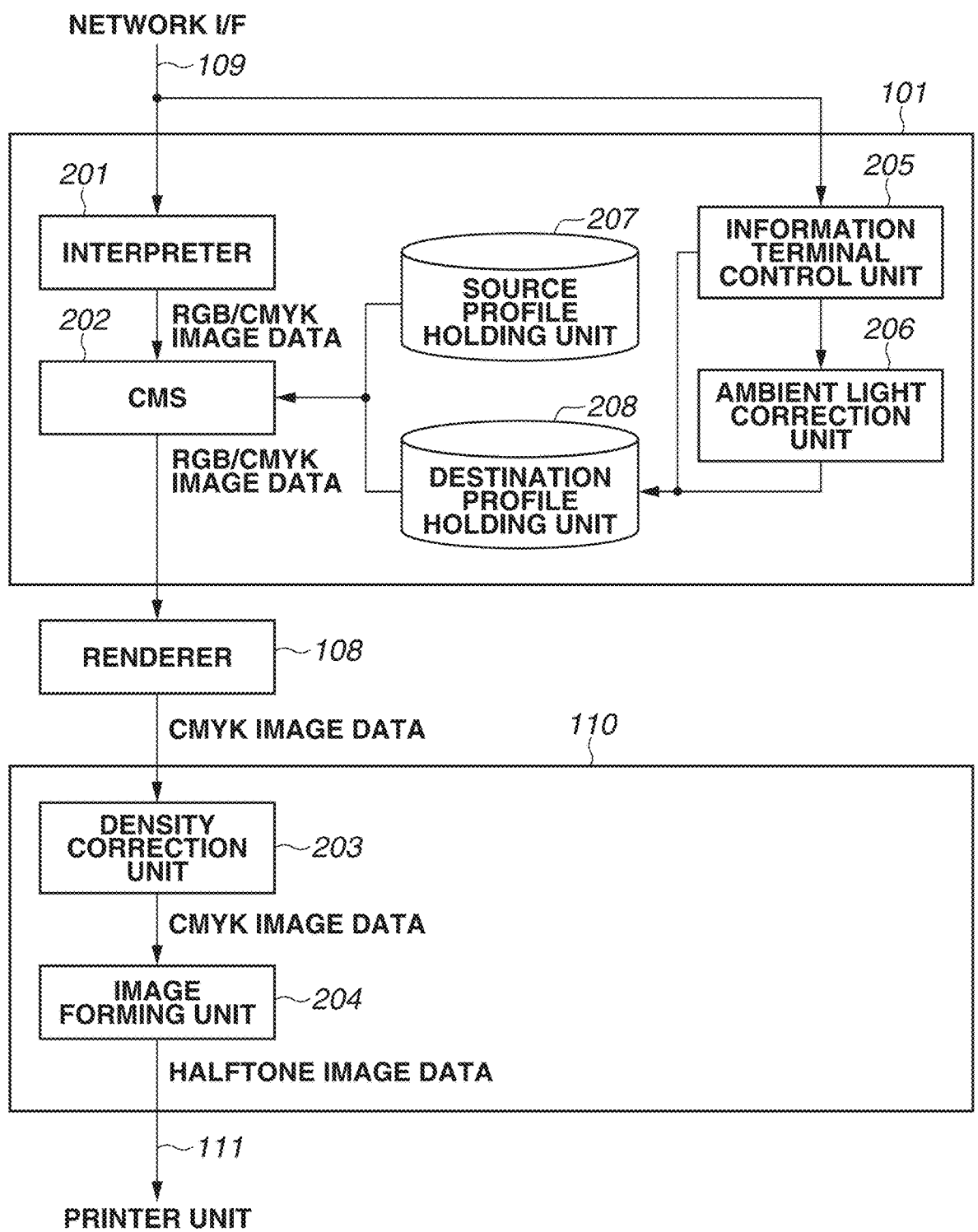
FIG. 4 is a block diagram illustrating configurations of a central processing unit (CPU) and an image processing unit according to the first exemplary embodiment.

FIG. 4 is a block diagram illustrating configurations of the CPU 101 and the image processing unit 110 according to the present exemplary embodiment. A configuration of a program that runs on the CPU 101 according to the present exemplary embodiment includes the interpreter 201, a color management system (CMS) 202, a source profile holding unit 207, a destination profile holding unit 208, an information terminal control unit 205, and an ambient light correction unit 206. A configuration of the image processing unit 110 includes a density correction unit 203 and an image forming unit 204.

While the configuration of the CPU 101 that performs each processing using software and the configuration of the image processing unit 110 that performs each processing using hardware are described in the present exemplary embodiment, a configuration performing all the processing using software or hardware can be employed.

Execution of each module unit is triggered by, for example, an instruction received from the computer 311 via the network I/F 109. For example, in a case where information about an instruction to perform a print operation is input to the CPU 101 via the network I/F 109, the CPU 101 loads a program for starting the print operation from the ROM 102 and executes each module unit based on the program. More specifically, the interpreter 201 interprets the PDL portion of the received print data and generates intermediate data (display list).

The CMS 202 performs color conversion using a source profile and a destination profile. As used herein, CMS is the abbreviation for Color Management System, and the CMS 202 performs color conversion using information of a color profile to be described below. The source profile is used to convert a device-dependent color space, such as an RGB color space or a CMYK color space, to a device-independent color space, such as an L*a*b* (hereinafter referred to as "Lab") color space or an XYZ color space, defined by the International Commission on Illumination (CIE). XYZ is a device-independent color space like Lab and represents colors using tristimulus values. The destination profile is a color profile for converting a device-independent color space to a CMYK color space dependent on the printer unit 111 based on a designated matching method. Typical color conversion methods are as follows.

Giving priority on color hue: Adjust the colors to be close to those on the screen of the display.

Minimization of color difference: Accurately output the designated colors within the color reproduction range of the printer.

Giving priority on vividness: Vividly reproduce the overall colors.

Alternatively, the CMS 202 may perform color conversion using a device link profile. The device link profile herein is a color profile for directly converting a device-dependent color space, such as an RGB color space or a CMYK color space, to a CMYK color space dependent on the printer unit 111. Which color profile to use in color conversion depends on the setting value set via the operation unit 106.

While one CMS handles the plurality of types of color profiles in the present exemplary embodiment, different CMSs can be used for different types of color profiles. In addition, the types of color profiles are not limited to the examples described in the present exemplary embodiment, and any type of color profile can be used as long as a CMYK color space dependent on the printer unit 111 is used. Furthermore, color conversion may be performed by interpolation calculation using a multi-dimensional lookup table (multi-dimensional LUT). For example, a three-dimensional LUT shows a correspondence relationship for converting RGB data to CMYK data and comprises N×N×N grid points.

Thus, with sufficiently-narrow grid spacing, color conversion can be accurately performed in principle. In reality, however, it is extremely rare for a color conversion target point to correspond to a grid point due to the memory capacity, the processing speed, or the like. Accordingly, three-dimensional interpolation processing is performed to obtain CMYK. A similar method can also be used for color conversion from CMYK data to CMYK data, using a four-dimensional LUT.

The density correction unit 203 performs correction processing on the CMYK data processed by the CMS 202 in order to maintain the density characteristics of the printer unit 111 constant. The image forming unit 204 converts the CMYK image data corrected by the density correction unit 203 into N-bit (N is an integer) halftone image data suitable for the printer unit 111, and transmits the N-bit halftone image data to the printer unit 111. Various halftone processing methods such as a density pattern method, an ordered dither method, and an error diffusion method are available, and any of the methods can be used in the present exemplary embodiment.

[Configuration of Information Terminal Control Unit]

Figure 5:
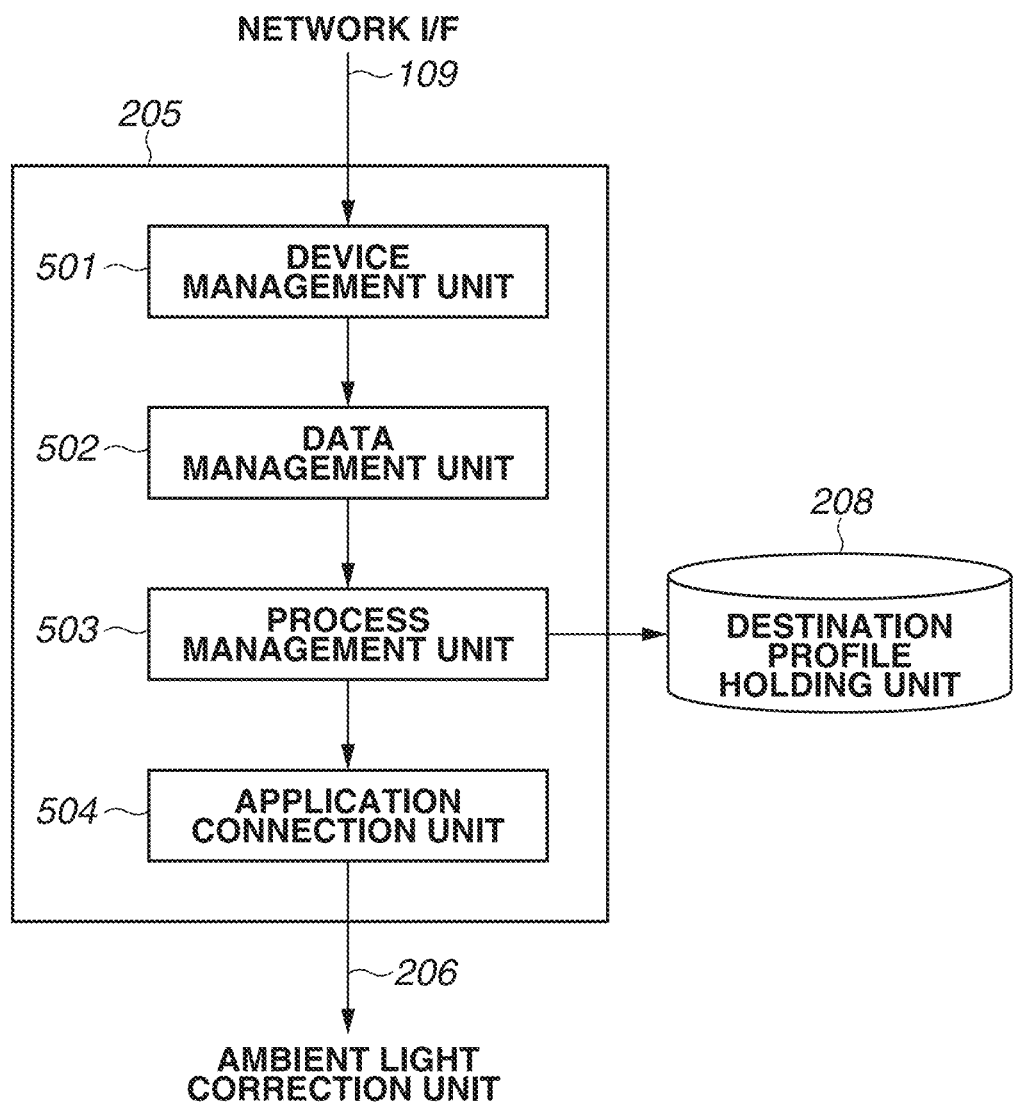
FIG. 5 is a block diagram illustrating a configuration of an information terminal control unit according to the first exemplary embodiment.

FIG. 5 is a block diagram illustrating a configuration of the information terminal control unit 205. The information terminal control unit 205 controls the information terminal apparatus 306 via the network I/F 109 and the network 302. In the present exemplary embodiment, since the information terminal apparatus 306 is described as an RFID reader/writer, the information terminal control unit 205 refers to RFID middleware. RFID middleware is standardized by EPCglobal (EPC is the abbreviation for Electronic Product Code), which is an international standardization organization. The functional role of the information terminal control unit 205 is to connect to the RFID reader/writer (the information terminal apparatus 306), filter the data of the information tag 307 read from the RFID reader/writer, and then converts the data into extracted data suitable for processing and transmits the extracted data.

The information terminal control unit 205 according to the present exemplary embodiment includes a device management unit 501, a data management unit 502, a process management unit 503, and an application connection unit 504.

The device management unit 501 connects to the information terminal apparatus 306 via the network I/F 109 and the network 302, receives the data transmitted from the information terminal apparatus 306, and manages the device settings. More specifically, the device management unit 501 turns on or off the information terminal apparatus 306, changes the radio wave output, and the like. This enables easy connection to a plurality of different types of the information terminal apparatuses 306, the management thereof, and the receipt of data therefrom.

The data management unit 502 filters out redundant data in the data of the information tag 307 transmitted from the information terminal apparatus 306, and holds the data of the information tag 307. For example, there is a case (not illustrated) where, at the location 304 illustrated in FIG. 1, there is a plurality of the information tags 307 attached to the illumination apparatus 308 and other things. In this case, although the ambient light correction unit 206 (described below) needs information about the illumination apparatus 308, the information terminal apparatus 306 reads all the information tags 307 within the reading range, which causes unnecessary information (information about the other things) to be transmitted to the ambient light correction unit 206. To address this, the data management unit 502 performs filtering to discard such unnecessary data and to transmit only necessary data. Details of this processing will be described below with reference to step S408 of FIG. 6A.

The process management unit 503 manages cooperation with an external device or another module based on the data of the information tag 307 that is transmitted from the information terminal apparatus 306. In the present exemplary embodiment, the process management unit 503 extracts a color code from the product number of the illumination apparatus 308 that is included in the information tag 307. The process management unit 503 then acquires a correlated color temperature (K), an average color rendering index (Ra), and a luminous flux (lm) based on the color code, and determines whether a color profile corresponding thereto is held in the destination profile holding unit 208. In a case where the process management unit 503 determines that no corresponding color profile is held, the process management unit 503 accesses the server apparatus 303 via the network I/F 109 and the network 302 to acquire spectral data corresponding to the illumination apparatus 308. Details of this processing will be described below with reference to steps S409 to S411 of FIG. 6A.

The application connection unit 504 provides the data received through the device management unit 501, the data management unit 502, and the process management unit 503, which are describe above, to the ambient light correction unit 206. The application connection unit 504 mainly performs format conversion of the data to be transmitted to the ambient light correction unit 206.

The ambient light correction unit 206 generates a color profile for ambient light correction that corresponds to the illumination apparatus 308, using the spectral data of the illumination apparatus 308 that is transmitted from the information terminal control unit 205 and using the spectral data of a color chart of the printer unit 111 that is held in advance in the HDD 104. The ambient light correction unit 206 then registers the generated color profile in the destination profile holding unit 208. Details of this processing will be described below with reference to steps S415 to S417 of FIG. 6B.

The source profile holding unit 207 manages the source profile for converting CMYK image data input from the computer 311 from a device-dependent color space to a device-independent color space such as a Lab color space or an XYZ color space. The device-dependent color space depends on the device model or the toner color.

The destination profile holding unit 208 manages the color profile for converting a device-independent color space to a CMYK color space dependent on the device (the printer unit 111).

[Processing for Generation of Color Profile for Ambient Light Correction]

FIGS. 6A and 6B illustrate a flowchart illustrating processing for generating a color profile for ambient light correction according to the present exemplary embodiment. The processing is implemented by the CPU 101 loading a program for performing the processing from the ROM 102 into the RAM 103 and executing each module unit. Details of screen control related to the processing will be described below with reference to FIG. 13.

Figure 7A:
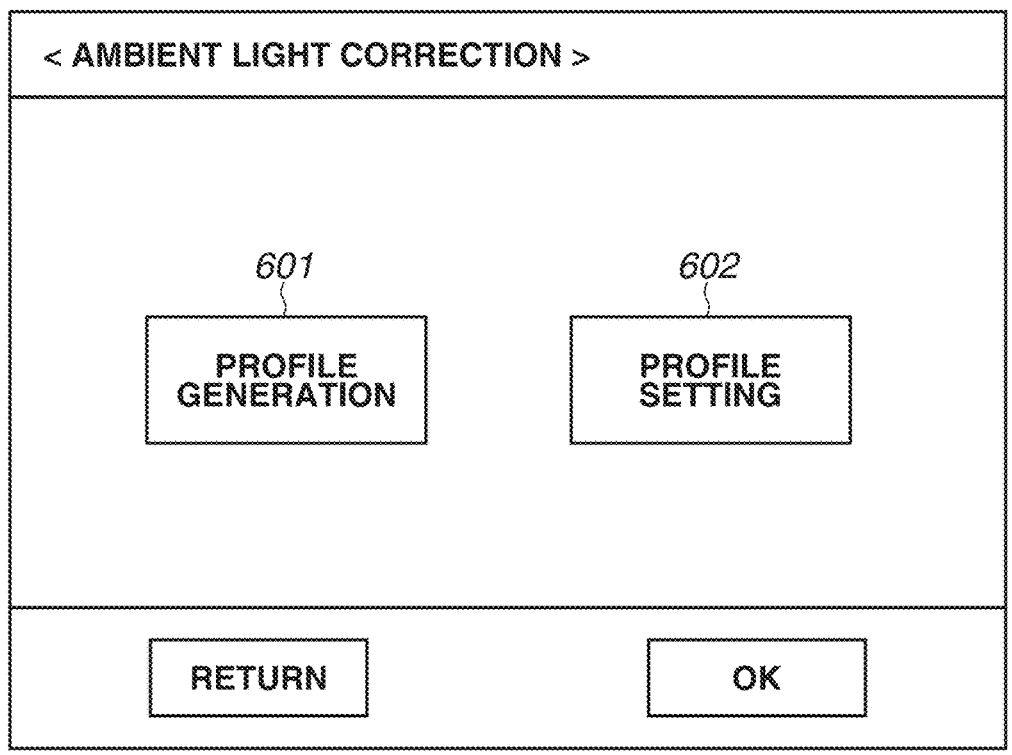

In step S401, the display unit 105 displays an ambient light correction screen illustrated in FIG. 7A. The operation unit 106 then receives selection of an object 601 from a user 400 (i.e., the operation unit 106 receives a profile generation instruction).

Figure 7B:
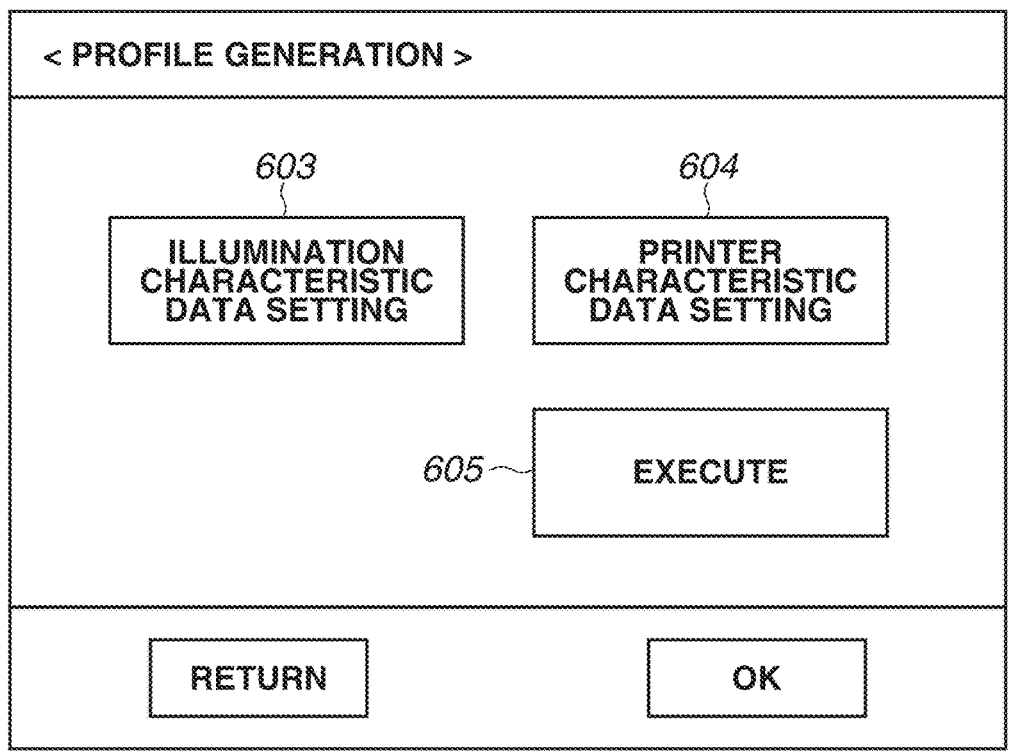

In step S402, the display unit 105 displays a color profile generation screen illustrated in FIG. 7B, and the operation unit 106 receives selection of an object 603 from the user 400. The display unit 105 then displays an illumination characteristics setting screen illustrated in FIG. 7D.

In step S403, the operation unit 106 receives, from the user 400, selection of an object 607, i.e., selection of the number of the location for which the user 400 desires to perform ambient light correction.

In step S404, the device management unit 501 connects to the information terminal apparatus 306 at the location selected in step S403 and transmits, to the information terminal apparatus 306, a request for the data stored in the information tag 307.

In step S405, the information terminal apparatus 306 transmits, to the information tag 307, a request for the data stored in the information tag 307 via short-range (which is several centimeters to several meters depending on the frequency band) wireless communication using an electromagnetic field or an electric field.

In step S406, in a case where the information tag 307 is a "passive" tag without a built-in battery, the information tag 307 is powered by radio waves from the information terminal apparatus 306 to reflect (transmit) the data stored in the memory as an electronic signal. The information terminal apparatus 306 receives this electronic signal, so that the reading (scanning) ends. In a case where the information tag 307 is an "active" tag with a built-in battery, the information terminal apparatus 306 receives radio waves from the information tag 307 to read the data.

In step S407, the information terminal apparatus 306 transmits the data received from the information tag 307 to the device management unit 501.

In step S408, the device management unit 501 transmits the data received from the information tag 307 to the data management unit 502. The data management unit 502 filters the data received from the information tag 307 to discard unnecessary data and extract the data of the illumination apparatus 308.

More specifically, the data management unit 502 filters the product number of the illumination apparatus 308 because the received data may include a plurality of product numbers. One example of the filtering method is character string extraction using a regular expression. In the character string extraction using the regular expression, a search is performed for a character string that matches a character string pattern, using a general-purpose description method (regular expression) expressing a character string set (pattern), and the character string is extracted. A meta-character is used as the regular expression pattern. For example, there is a rule that a postal code comprises of a three-digit number followed by a four-digit number with a hyphen between the three-digit number and the four-digit number, so that the postal code is expressed as "postal code=\\d{3}-\\d{4}" using the meta-character.

Similarly, there is a common rule for the product numbers of illumination apparatuses that is shared by the manufacturers. As illustrated in FIG. 8, a product number 701 at the beginning of each product number indicates the lighting type of the illumination apparatus. For example, "FL" indicates a starter type (which requires a glow starter), "FLR" indicates a rapid start type (which does not require a glow starter), and "FHF" indicates an Hf type (which is designed specifically for Hf-type illumination apparatuses). Next, a product number 702 indicates a tube length (wattage). For example, "40" indicates a 40-W type, and "110" indicates a 110-W type. Next, a product number 703 indicates a tube diameter (thickness). For example, "SS" indicates 28 mm, and "S" indicates 32.5 mm Next, a product number 704 indicates the color of light.

The product number 704 is the color code used in the present exemplary embodiment. As illustrated in FIG. 9, the product number 704 (color code) corresponds to the wavelength (three-wavelength type, high color rendering type, or normal type) and color temperature (incandescent, warm white, white, natural white, or daylight) of the illumination apparatus, and typical characteristic values (correlated color temperature, average color rendering index, and luminous flux) of a commercial fluorescent lamp can be obtained based on the color code. Next, a product number 705 indicates a type. For example, the product number 705 with "M" indicates a rapid starter type, and the product number 705 without "M" indicates a glow starter type. A product number 706 indicates power consumption. Based on the above-described rule, the meta-character of an illumination apparatus is expressed as illumination apparatus product number="^(FL|FLR|FHF)(40|110)(S|SS)(EX-)?(D|N|W|WW|L|LE)(-EDL)?(/M)?/.*". In one embodiment, the image forming apparatus 300 extracts the product number that matches this regular expression, so that the product number of the illumination apparatus 308 is filtered.

In a case where detection of the product number of the illumination apparatus 308 fails due to a communication error or a detection error, the display unit 105 can display a screen illustrated in FIG. 7F to prompt the user to manually input the product number of the illumination apparatus 308. The data management unit 502 then notifies the process management unit 503 of the product number of the illumination apparatus 308.

In step S409, the process management unit 503 acquires the color code (corresponding to the product number 704 illustrated in FIG. 8) from the product number of the illumination apparatus 308 that is extracted in step S408.

In step S410, the process management unit 503 acquires light source characteristic information based on the color code extracted in step S409. The light source characteristic information is a correlated color temperature (K), an average color rendering index (Ra), and a luminous flux (lm). The method for acquiring the characteristic information is that a correspondence table illustrated in FIG. 9 is stored in advance in the HDD 104, and the process management unit 503 reads and compares the correspondence table with the acquired color code to acquire the characteristic information. Instead of the typical characteristic values, the spectral data corresponding to the product number of the illumination apparatus 308 can be acquired. More specifically, the process management unit 503 transmits a notification to the device management unit 501, and the device management unit 501 acquires the spectral data corresponding to the product number of the illumination apparatus 308 from the server apparatus 303 via the network I/F 109 and the network 302.

In step S411, the process management unit 503 determines whether the corresponding color profile is held, based on the correlated color temperature, the average color rendering index, and the luminous flux that are acquired in step S410. For the determination, as illustrated in FIG. 10, a list of color profiles each corresponding to values of a correlated color temperature (K), an average color rendering index (Ra), and a luminous flux (lm) is stored in advance in the HDD 104.

The process management unit 503 reads the color profile list and compares the list with the values of the correlated color temperature, the average color rendering index, and the luminous flux that are acquired in step S410, thereby determining whether the corresponding color profile is held. In a case where the process management unit 503 determines that the corresponding color profile is held (YES in step S411), the processing proceeds to step S412. On the other hand, in a case where the process management unit 503 determines that the corresponding color profile is not held (NO in step S411), the processing proceeds to step S413.

As an alternative configuration, the color profile list may be held for each paper type in the HDD 104, and a printer characteristics setting screen illustrated in FIG. 7E may be displayed. Then, the color profile list may be read based on the user's selection of an object 608, i.e., selection of a paper type.

In a case where the process management unit 503 determines that the corresponding color profile is held (YES in step S411), then in step S412, the CPU 101 receives the PDL data input from the computer 311. The CPU 101 then performs printing control for the intermediate data generated from the received PDL data. More specifically, the CPU 101 causes the CMS 202 to read the corresponding color profile from the destination profile holding unit 208, and perform color conversion of the intermediate data using the color profile to generate raster image data. The CPU 101 then causes the printer unit 111 to print the raster image data generated by the color conversion on a sheet of paper.

In a case where the process management unit 503 determines that the corresponding color profile is not held (NO in step S411), then in step S413, the device management unit 501 connects to the server apparatus 303 via the network I/F 109 and the network 302 and transmits, to the server apparatus 303, a notification of the product number of the illumination apparatus 308 and a request for the corresponding spectral data. FIG. 2 illustrates an example of spectral data of an illumination apparatus. For example, in a case where the color code included in the product number of an illumination apparatus is "EX-N", the illumination apparatus is of a three-wavelength type, so that the spectral data of the illumination apparatus has peaks (refer to a wavelength 1403 illustrated in FIG. 2).

On the other hand, in a case where the color code included in the product number of an illumination apparatus is "N-EDL", the illumination apparatus is of a high color rendering type, so that the spectral data of the illumination apparatus has a broad characteristic with respect to the wavelength (refer to a wavelength 1402 illustrated in FIG. 2). Spectral data of sunlight has a characteristic indicated by a wavelength 1401 illustrated in FIG. 2.

In step S414, the server apparatus 303 transmits the spectral data corresponding to the product number of the illumination apparatus 308 to the device management unit 501, and the device management unit 501 notifies the ambient light correction unit 206 of the spectral data. In a case where acquisition of the spectral data of the illumination apparatus 308 fails due to a communication error, the display unit 105 can display a screen illustrated in FIG. 7G to prompt the user to manually input the spectral data of the illumination apparatus 308.

Alternatively, the display unit 105 may display a screen illustrated in FIG. 7H, and in a case where the user select "Yes" on the screen, a color profile corresponding to the correlated color temperature, average color rendering index, and luminous flux that are closest to those acquired in step S410 may be selected. In this case, steps S415 to S418 are skipped, and color conversion is performed using the color profile to perform printing.

Figure 11A:
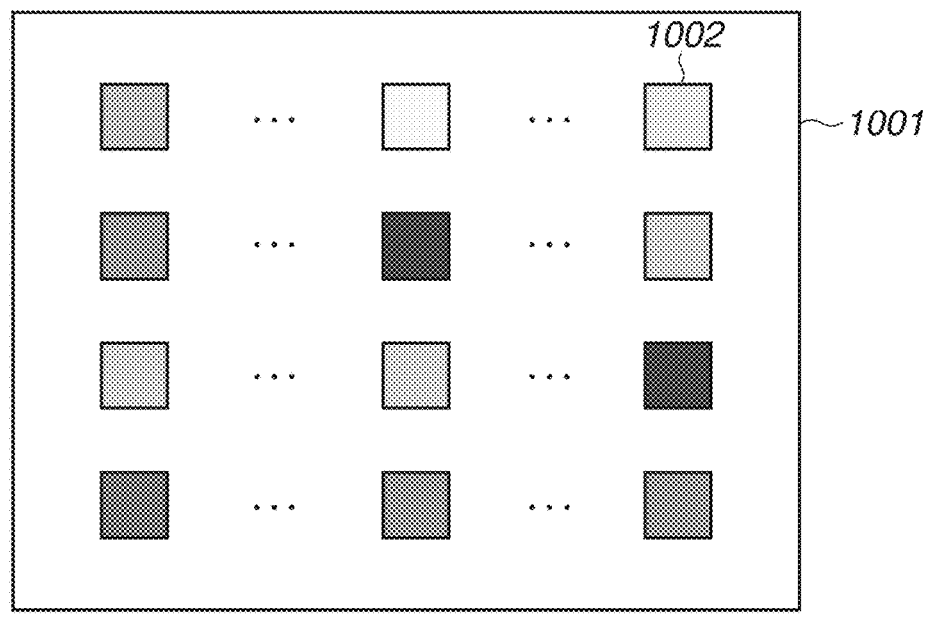
FIG. 11A is a diagram illustrating an example of a patch arrangement of a color chart.

In step S415, the ambient light correction unit 206 acquires the spectral data of the color chart that is stored in advance in the HDD 104. In the color chart, patches of signal values of mixed colors are arranged. For example, in a color chart 1001 illustrated in FIG. 11A, each patch 1002 printed on the color chart 1001 has a signal value of a mixed color. The color chart 1001 is printed by the image forming apparatus 300 and the colors are measured by a color measurement device, so that the spectral data is acquired as device characteristic information.

Figure 11B:
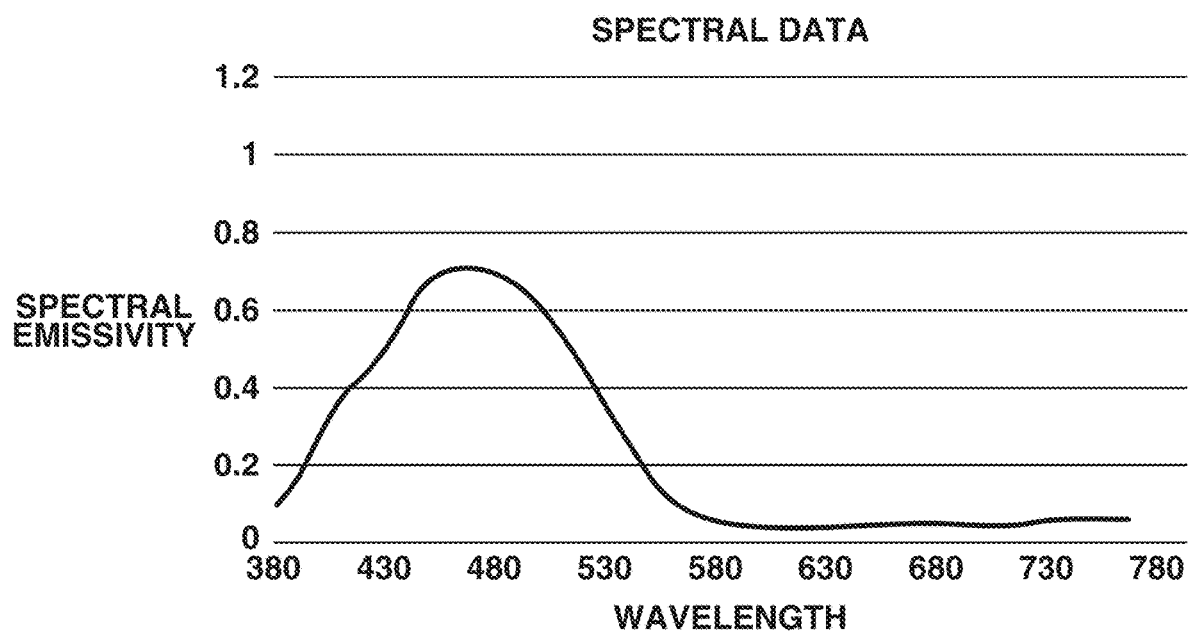
FIG. 11B is a diagram illustrating an example of spectral data.

FIG. 11B illustrates an example of spectral data of a patch with a signal value (255, 0, 0, 0) of a mixed color. Since the signal value of the mixed color is (255, 0, 0, 0), the color of the patch is cyan, and the spectral data has a peak at short wavelength (380 nm to 500 nm). The spectral data is stored in advance in the HDD 104 for each of the patches printed on the color chart 1001. The spectral data of the color chart can be stored in plural numbers according to paper type. For example, in a case where plain paper is selected on the screen illustrated in FIG. 7E, spectral data of the color chart that corresponds to plain paper is acquired.

Returning to the description of FIG. 6B, in step S416, the ambient light correction unit 206 generates a color profile for ambient light correction, using the spectral data of the illumination apparatus 308 that is acquired in step S414 and using the spectral data of the color chart that is acquired in step S415 and exhibits the characteristics of the printer unit 111.

The detailed processing using a color appearance model (hereinafter referred to as "CAM") considering an observation environment will be described. The CAM introduces perceptual and psychological characteristics based on chromatic adaptation to absorb a difference of ambient light, allowing color matching in any environment.

First, a white point reference (Xw, Yw, Zw) of output ambient light is calculated by the following formulas 1-1 to 1-4, using the spectral data of the illumination apparatus 308 and the spectral data of the color chart.

$$X_w = K\Sigma S_{(\lambda)} R_{(\lambda)} \overline{x_{(\lambda)}} d\lambda \quad (1\text{-}1)$$

$$Y_w = K\Sigma S_{(\lambda)} R_{(\lambda)} \overline{y_{(\lambda)}} d\lambda \quad (1\text{-}2)$$

$$Z_w = K\Sigma S_{(\lambda)} R_{(\lambda)} \overline{z_{(\lambda)}} d\lambda \quad (1\text{-}3)$$

$$K = 100/\Sigma S_{(\lambda)} \overline{y_{(\lambda)}} d\lambda \quad (1\text{-}4)$$

Figure 12:
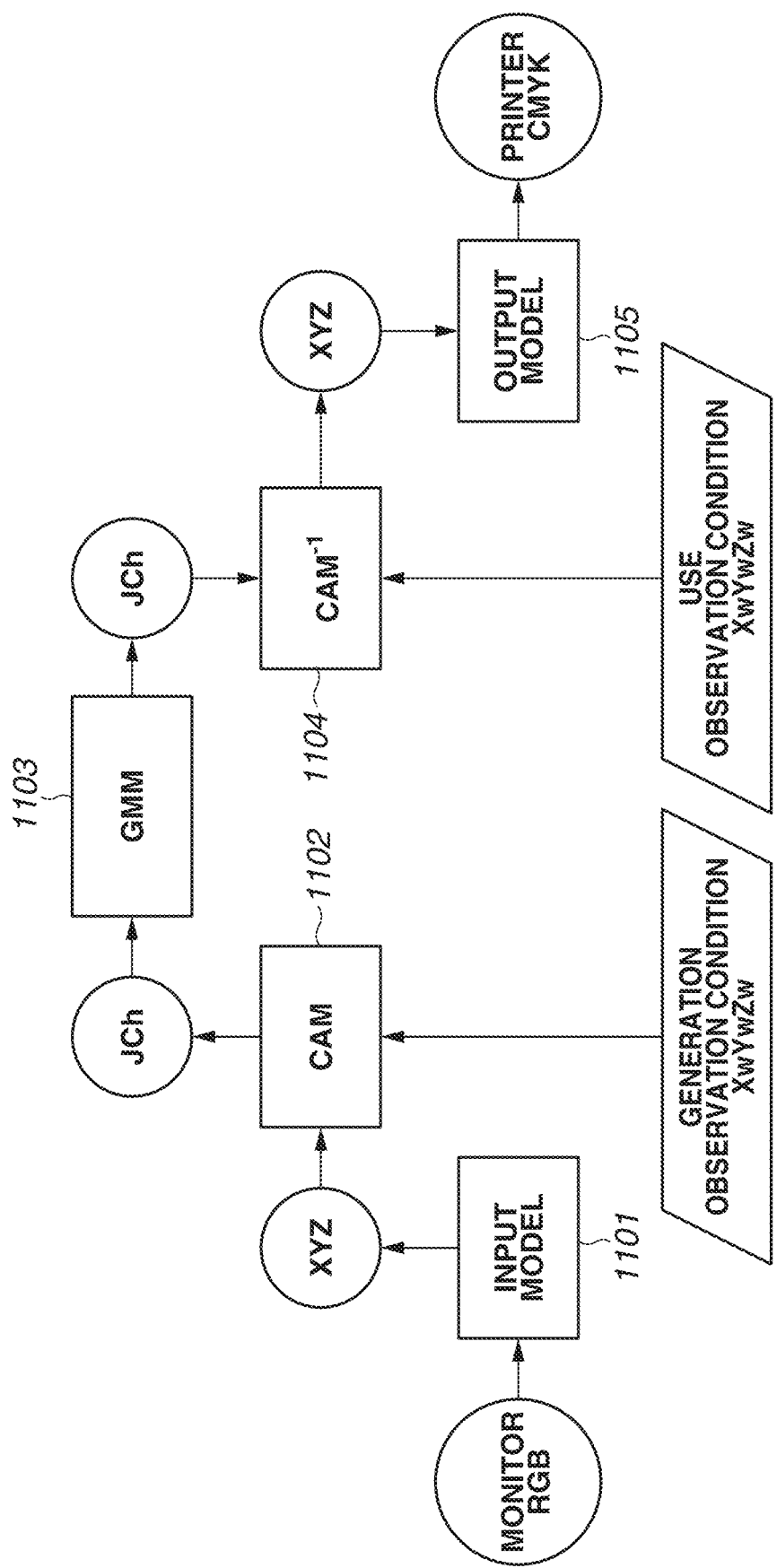
FIG. 12 is a block diagram illustrating processing for generating a color profile for ambient light correction according to the first exemplary embodiment.

$S_{(\lambda)}$: Spectral data of illumination apparatus
$R_{(\lambda)}$: Spectral data of color chart
$\Delta\lambda$: Wavelength interval (380 nm to 780 nm)
$\overline{X_{(\lambda)}}, \overline{Y_{(\lambda)}}, \overline{Z_{(\lambda)}}$: Color matching function of XYZ color system Next, an input model 1101, which is a conversion matrix or a conversion LUT in FIG. 12, converts RGB data dependent on an input device to device-independent XYZ data based on a white point reference of input-side ambient light. The input device herein is the monitor 310 used by the user to design an original. As the white point reference of the input ambient light, for example, CIE Standard Illuminant D65 is used. D65 is intended to represent average daylight.

A CAM 1102 is a forward conversion portion of the color appearance model, and converts the acquired data to a human color perception color space JCh. The color space JCh is a color space from which the effect of ambient light is removed. Performing color matching in the color space JCh enables color conversion under different environments.

A gamut map model (GMM) 1103 performs gamut compression so that the colors reproduced by the input device and the colors reproduced by the output device having a different color reproduction range from that of the input device can match. A CAM$^{-1}$ 1104 is an inverse conversion portion of the color appearance model, and converts color space data of the human color perception color space JCh to device-independent XYZ data based on the white point reference of output ambient light. The output device herein is the image forming apparatus 300, and the white point reference of the output ambient light is the white point reference (Xw, Yw, Zw) of the output ambient light that is calculated using the formulas 1-1 to 1-4.

An output model 1105 converts the data to color space data dependent on the output device. The color conversion table for conversion from monitor RGB to printer CMYK that is generated by the above-described processing is stored in the color profile. While the generation of the color profile for converting an RGB image to a CMYK image is described with reference to FIG. 12, a color profile for converting a CMYK image to a CMYK image can also be generated by similar processing.

Returning to the description of FIG. 6B, in step S417, the ambient light correction unit 206 stores the color profile generated in step S416 in the destination profile holding unit 208.

In step S418, the display unit 105 notifies the user that the color profile generation is completed.

In step S419, the CPU 101 receives the PDL data input from the computer 311.

In step S420, the CMS 202 reads the corresponding color profile from the destination profile holding unit 208 to perform printing.

[Screen Control for Ambient Light Correction]

Figure 13:
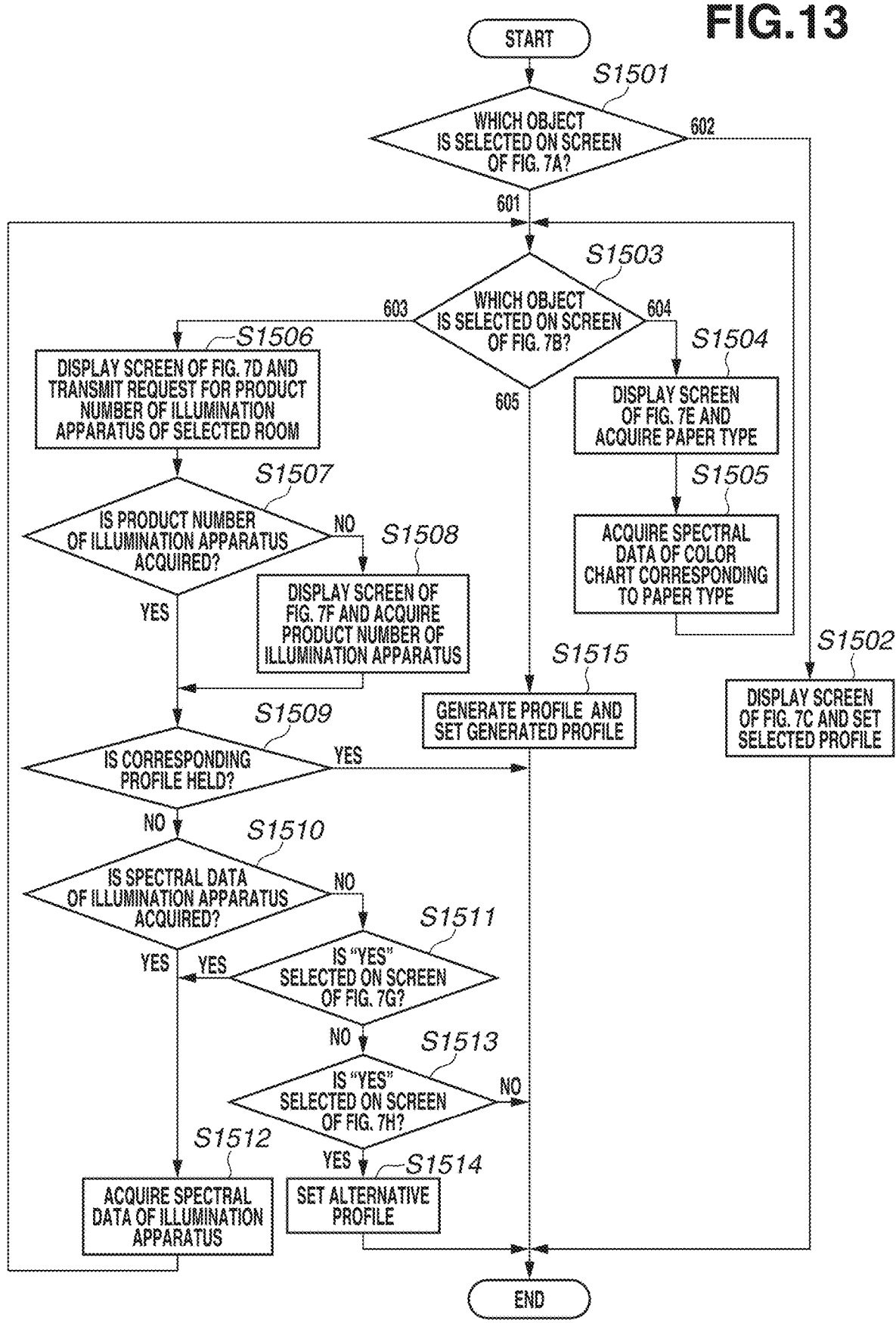
FIG. 13 is a diagram illustrating an example of screen control according to the first exemplary embodiment.

FIG. 13 is a flowchart illustrating screen control that is related to the processing for generating the color profile for ambient light correction according to the present exemplary embodiment. The screen control is implemented by the CPU 101 loading a program for performing the control from the ROM 102 into the RAM 103 and executing each module unit.

In step S1501, the display unit 105 displays the ambient light correction screen illustrated in FIG. 7A, and the operation unit 106 determines which one of the objects 601 and 602 is selected.

In a case where the object 601 is selected ("601" in step S1501), the processing proceeds to the processing for generating the color profile for ambient light correction. In a case where the object 602 is selected ("602" in step S1501), the processing proceeds to processing for selecting a color profile from the profile list stored in the HDD 104. In a case where the object 601 is selected ("601" in step S1501), the processing proceeds to step S1503. In a case where the object 602 is selected ("602" in step S1501), the processing proceeds to step S1502.

In step S1502, the display unit 105 displays a profile setting screen illustrated in FIG. 7C. The operation unit 106 then determines which color profile is selected from a profile list 606. The ambient light correction unit 206 reads the selected color profile from the destination profile holding unit 208, and sets the color profile in the CMS 202.

In step S1503, the display unit 105 displays the profile generation screen illustrated in FIG. 7B, and the operation unit 106 determines which one of the objects 603, 604, and 605 is selected.

In a case where the object 604 is selected ("604" in step S1503), the processing proceeds to step S1504 to perform the processing for acquiring the spectral data of the color chart of the image forming apparatus 300. In step S1504, the display unit 105 displays the printer characteristics setting screen illustrated in FIG. 7E, and the operation unit 106 determines which paper type is selected from the paper type list illustrated in FIG. 7E.

In step S1505, the ambient light correction unit 206 acquires the spectral data of the color chart that is stored in advance in the HDD 104 and corresponds to the selected paper type. After completion of step S1505, the processing returns to step S1503.

In step S1503, the object 605 is not selectable (grayed out) in an initial state. The object 605 is enabled in a case where illumination apparatus characteristic data and printer characteristic data are both set. In a case where the object 605 is selected ("605" in step S1503), the processing proceeds to step S1515. In step S1515, the processing for generating the color profile for ambient light correction is performed. The ambient light correction unit 206 generates the color profile for ambient light correction, using the spectral data of the illumination apparatus and the spectral data of the color chart, and stores the generated color profile in the destination profile holding unit 208. The generated color profile is then set in the CMS 202.

Returning to step S1503, in a case where the object 603 is selected ("603" in step S1503), the processing proceeds to step S1506 to perform the processing for acquiring the spectral data of the illumination apparatus at the location where the user desires to display the printed product 309.

In step S1506, the display unit 105 displays the illumination characteristics setting screen illustrated in FIG. 7D. The operation unit 106 then determines which room is selected from the room list illustrated in FIG. 7D. The device management unit 501 connects to the information terminal apparatus 306 at the selected location and transmits, to the information terminal apparatus 306, a request for the data (illumination apparatus product number) stored in the information tag 307.

In step S1507, the data management unit 502 determines whether the product number of the illumination apparatus 308 is acquired. In a case where the product number is acquired (YES in step S1507), the processing proceeds to step S1509. On the other hand, in a case where the product number is not acquired (NO in step S1507), the processing proceeds to step S1508.

In step S1508, the display unit 105 displays the illumination product number input screen illustrated in FIG. 7F, and the operation unit 106 receives input of the product number of the illumination apparatus 308.

In step S1509, the process management unit 503 extracts the color code from the product number of the illumination apparatus 308, and obtains the correlated color temperature (K), the average color rendering index (Ra), and the luminous flux (lm) based on the color code. The process management unit 503 then determines whether a color profile corresponding to the correlated color temperature (K), the average color rendering index (Ra), and the luminous flux (lm) is held in the HDD 104. In a case where the process management unit 503 determines that the corresponding color profile is held (YES in step S1509), the corresponding profile is set in the CMS 202, and the processing ends. On the other hand, in a case where the process management unit 503 determines that the corresponding color profile is not held (NO in step S1509), the processing proceeds to step S1510.

In step S1510, the device management unit 501 connects to the server apparatus 303 and transmits, to the server apparatus 303, a request for the spectral data of the illumination apparatus 308. The device management unit 501 then determines whether the spectral data of the illumination apparatus 308 is acquired. In a case where the device management unit 501 determines that the spectral data is acquired (YES in step S1510), the processing proceeds to step S1512. On the other hand, in a case where the device management unit 501 determines that the spectral data is not acquired (NO in step S1510), the processing proceeds to step S1511.

In step S1511, the display unit 105 displays the illumination spectral data input screen illustrated in FIG. 7G, and the operation unit 106 determines which one of "Yes" and "No" is selected. In a case where the operation unit 106 determines that "Yes" is selected (YES in step S1511), the spectral data of the illumination apparatus 308 is received via a screen (not illustrated) and then the processing proceeds to step S1512. On the other hand, in a case where the operation unit 106 determines that "No" is selected (NO in step S1511), the processing proceeds to step S1513.

In step S1513, the display unit 105 displays the alternative profile use screen illustrated in FIG. 7H, and the operation unit 106 determines which one of "Yes" and "No" is selected. In a case where the operation unit 106 determines that "Yes" is selected (YES in step S1513), the processing proceeds to step S1514. On the other hand, in a case where the operation unit 106 determines that "No" is selected (NO in step S1513), an error message (not illustrated) indicating the failure of the color profile generation is displayed on the display unit 105, and the processing ends.

In step S1514, the ambient light correction unit 206 selects a color profile corresponding to the closest characteristics to those of the illumination apparatus 308, from among the color profiles held in the HDD 104 and sets the selected color profile in the CMS 202.

As described above, according to the present exemplary embodiment, characteristic data of an observation light source is acquired using an Internet-of-things (IoT) environment, and a color profile that is dynamically generated according to the characteristics is applied. This makes it possible to produce a product suitable for ambient light at an actual display location. Accordingly, the data volume of the color profile can be reduced, and ambient light correction can be performed appropriately for various types of observation light sources without requiring the user to measure the observation light sources.

In the first exemplary embodiment, the color profile for ambient light correction is generated by acquiring the product number of the illumination apparatus 308 from the information tag 307 using the information terminal apparatus 306 (RFID reader/writer) as an IoT environment, and acquiring the spectral data of the illumination apparatus 308 from the server apparatus 303. This makes it possible to reduce the data volume of the color profile and to perform ambient light correction appropriately for various types of observation light sources without requiring the user to measure the observation light sources.

In a second exemplary embodiment, a case will be described in which ambient light correction is performed when a "smart" illumination apparatus, which allows the user to freely change the brightness and color temperature of the light and is configured to perform Wi-Fi® communication, is used.

[Network System Configuration]

Figure 14:
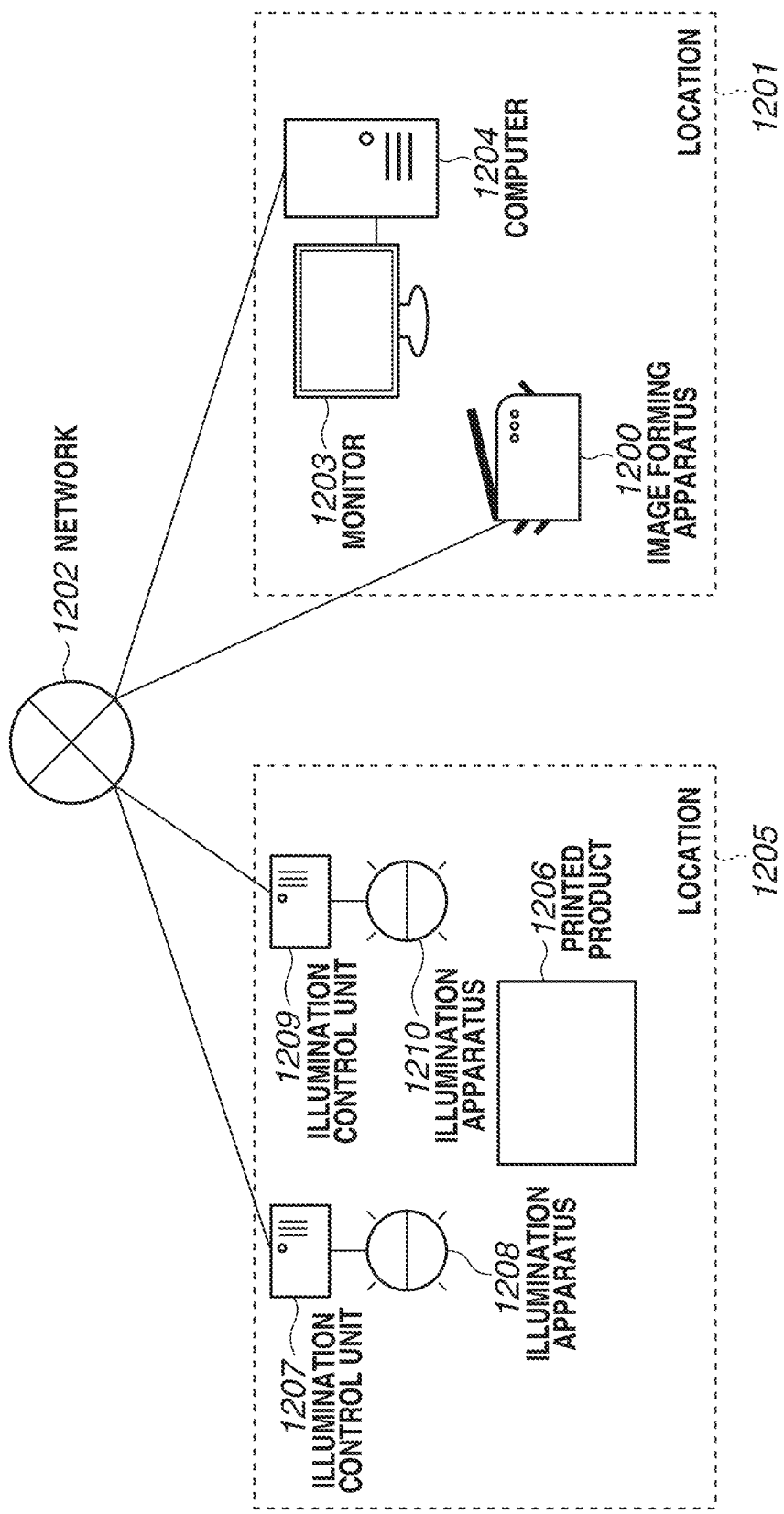
FIG. 14 is a block diagram illustrating an entire configuration of a network system according to a second exemplary embodiment.

FIG. 14 is a conceptual diagram illustrating an entire configuration of a network system according to the present exemplary embodiment. The network system according to the present exemplary embodiment includes a location 1201, a network 1202, and a location 1205. The location 1201 according to the present exemplary embodiment includes an image forming apparatus 1200, a monitor 1203, and a computer 1204. The location 1205 according to the present exemplary embodiment includes a printed product 1206, an illumination control unit 1207, an illumination apparatus 1208, an illumination control unit 1209, and an illumination apparatus 1210.

Details of the image forming apparatus 1200, the location 1201, the network 1202, the monitor 1203, the computer 1204, the location 1205, the printed product 1206, and the illumination apparatuses 1208 and 1210 are similar to those of the network configuration in FIG. 1 according to the first exemplary embodiment, and thus the description thereof will be omitted.

The illumination control unit 1207 controls wireless or wired communication between the network 1202 and the illumination apparatus 1208, and the illumination control unit 1209 controls wireless or wired communication between the network 1202 and the illumination apparatus 1210. In addition, the brightness and color temperature of the light of each of the illumination apparatuses 1208 and 1210 is adjustable, and spectral data is held in advance for each adjustment value. The brightness and color temperature can be adjusted using a switch (not illustrated) provided at the location 1205 or using an application of a smartphone or a smart speaker.

In the present exemplary embodiment, the two illumination apparatuses 1208 and 1210 are provided at the location 1205, and the brightness level and color temperature are set differently for each of the illumination apparatuses 1208 and 1210. The number of illumination apparatuses is not limited to two, and even in a case where more illumination apparatuses are provided, processing can be performed using a method to be described below. Furthermore, 5G can be used in communication with the network 1202.

A block diagram illustrating a configuration of the image forming apparatus 300 according to the present exemplary embodiment is similar to that according to the first exemplary embodiment, and thus the description thereof will be omitted. A block diagram illustrating configurations of the CPU 101 and the image processing unit 110 according to the present exemplary embodiment is similar to that according to the first exemplary embodiment, and thus the description thereof will be omitted.

A block diagram illustrating a configuration of the information terminal control unit 205 according to the present exemplary embodiment is similar to that according to the first exemplary embodiment, and thus the description thereof will be omitted. A difference from the configuration according to the first exemplary embodiment is that the information terminal control unit 205 controls the illumination control unit 1207 and the illumination control unit 1209 in the present exemplary embodiment, while the information terminal control unit 205 controls the information terminal apparatus 306 (RFID reader/writer) in the first exemplary embodiment.

[Processing for Generation of Color Profile for Ambient Light Correction]

FIGS. 15A and 15B represent a flowchart illustrating processing for generating a color profile for ambient light correction according to the present exemplary embodiment. The processing is implemented by the CPU 101 loading a program for performing the processing from the ROM 102 into the RAM 103 and executing each module unit. Portions similar to those in FIGS. 6A and 6B are given the same reference numerals, and the description thereof will be omitted.

In step S1301, the device management unit 501 connects to the illumination control unit 1207 and transmits, to the illumination control unit 1207, a request for spectral data 1 corresponding to the current brightness and color temperature of the illumination apparatus 1208.

In step S1302, the illumination control unit 1207 notifies the device management unit 501 of the spectral data 1 corresponding to the current brightness and color temperature of the illumination apparatus 1208. The device management unit 501 then notifies the process management unit 503 of the spectral data 1.

In step S1303, the device management unit 501 connects to the illumination control unit 1209 and transmits, to the illumination control unit 1209, a request for spectral data 2 corresponding to the current brightness and color temperature of the illumination apparatus 1210.

In step S1304, the illumination control unit 1209 notifies the device management unit 501 of the spectral data 2 corresponding to the current brightness and color temperature of the illumination apparatus 1210. The device management unit 501 then notifies the process management unit 503 of the spectral data 2.

In step S1305, the process management unit 503 multiplies n-pieces of spectral data of illumination apparatuses using the following formula 2-1 to calculate the total spectral data (combined information) of the illumination apparatuses. With this processing, spectral data of ambient light can be generated using a plurality of illumination apparatuses (the two illumination apparatuses 1208 and 1210 in this example) at the location 1205.

$$S_{(\lambda)} = \prod_{i=1}^{n} S_{i(\lambda)} \Delta \lambda \qquad (2\text{-}1)$$

$S_{(\lambda)}$: Total spectral data
$S_{i(\lambda)}$: Spectral data of illumination apparatus i In step S1306, the process management unit 503 calculates the correlated color temperature (K), the average color rendering index (Ra), and the luminous flux ($\Phi$) based on the total spectral data of the illumination apparatuses that is calculated in step S1305. The correlated color temperature, the average color rendering index, and the luminous flux can be calculated using known calculation formulas, which will be briefly described below. Regarding the correlated color temperature, the color of light to be represented is matched with the color of light emitted from a black body having a certain temperature (a high temperature) and the corresponding temperature of the black body is defined as the color temperature.

The color temperature is thus determined by calculating the white point reference (Xw, Yw, Zw) of the illumination light using the above-described formulas 1-1 to 1-4, calculating the xy chromaticity using the following formula 2-2, and comparing the xy-chromaticity with the locus of the black body on an xy chromaticity diagram. In a case where the color of the light source is not on the locus of the black body, the black body temperature that does not match perfectly but is the closest is calculated as the correlated color temperature.

$$x = \frac{X}{X+Y+Z} \quad y = \frac{Y}{X+Y+Z} \quad z = \frac{Z}{X+Y+Z} \qquad (2\text{-}2)$$

The average color rendering index (Ra) is a quantitative numerical value (Ra) representing a characteristic of a light source that influences how the color of an object is perceived when the light source illuminates the object. In general, the average color rendering index of a light source closer to natural light is determined as "good" or "excellent", and the average color rendering index of a light source farther from natural light is determined as "bad" or "inferior" with respect to natural light as a reference. More specifically, a test color for color rendering evaluation is predefined, and spectral data of a reference light source (which is generally natural light) and spectral data of a sample light source (the total spectral data calculated in step S1305 in this example) are used. The calculation method is such that the UV chromaticity is calculated from the two pieces of spectral data, and the average color rendering index (Ra) is calculated based on a distance ($\Delta E$) between the reference light and the sample light on the color space, using the following formulas 2-3 and 2-4.

$$R_i = 100 - 4.6 \times \Delta E_i (i=1 \text{ to } 15) \qquad (2\text{-}3)$$

$$R_a = (R_1 + R_2 + \ldots + R_8)/8 \qquad (2\text{-}4)$$

i: Number of test color

The luminous flux ($\Phi$) is a physical quantity (unit: lumen (lm)) representing the brightness of light passing through a surface. The luminous flux ($\Phi$) is weighted by wavelength according to human visual sensitivity as defined by the following formula 2-5.

$$\Phi = \int_{\infty_0}^{\infty} K_\lambda \Phi_\lambda d\lambda \qquad (2\text{-}5)$$

$K_\lambda$: Spectral luminous efficacy
$\Phi_\lambda$: Spectral data of illumination apparatus As described above, according to the present exemplary embodiment, a plurality of smart illumination apparatuses is used as an IoT environment, and spectral data corresponding to the currently-set brightness and color temperature of each of the smart illumination apparatuses is acquired. Then, a color profile that is dynamically generated according to the characteristics is applied, so that a product suitable for ambient light can be produced. This makes it possible to reduce the data volume of the color profile, and to perform ambient light correction appropriately for observation light sources that can be changed in brightness and color temperature, without requiring the user to measure the observation light sources.

While various examples and exemplary embodiments of the disclosure have been described above, the spirit and scope of the disclosure are not to be limited by a specific description in the present specification. For example, in the second exemplary embodiment, the number of illumination apparatuses may be one. Furthermore, in the first exemplary embodiment, there may be a plurality of illumination apparatuses. In a case where there is a plurality of illumination apparatuses in the first exemplary embodiment, one information terminal apparatus may communicate with a plurality of information tags, or there may be a plurality of pairs of an information terminal apparatus and an information tag (illumination apparatus).

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc. All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-108209, filed Jun. 23, 2020, which is hereby incorporated by reference herein in its entirety.

What is claimed is:

1. An apparatus including a print controller configured to perform color conversion on data using a color profile to generate image data for use in printing, the apparatus comprising:

a user interface configured to receive a color profile generation instruction; and a controller having one or more processors which execute instructions stored in one or more memories, the controller being configured to:

acquire information regarding at least one illumination apparatus via a network after the user interface receives the color profile generation instruction;

acquire first characteristic information of a light source based on the acquired information regarding the at least one illumination apparatus;

acquire second characteristic information of the light source based on a color chart printed by the apparatus; and generate a color profile based on the first and second characteristic information, wherein the user interface is further configured to receive selection of a location from among a plurality of locations, wherein the at least one illumination apparatus is placed at the selected location, and the controller is configured to acquire the information regarding the at least one illumination apparatus via the network based on the selected location, and wherein, in a case where the controller fails to acquire the information regarding the at least one illumination apparatus, the user interface is configured to provide a notification of information indicating a failure of the acquisition, and to prompt input of the information regarding the at least one illumination apparatus.

2. The apparatus according to claim 1, further comprising a storage configured to store color profiles,
wherein the controller is configured to determine whether a color profile corresponding to the first characteristic information is stored in the storage,
wherein, in a case where the color profile corresponding to the first characteristic information is stored in the storage, the controller is configured to generate no color profile, and
wherein, in a case where the color profile corresponding to the first characteristic information is not stored in the storage, the controller is configured to generate the color profile.

3. The apparatus according to claim 2,
wherein the generated color profile is newly stored in the storage, and
wherein the print controller is configured to use the color profile that is newly stored in the storage.

4. The apparatus according to claim 2,
wherein the storage is configured to pre-store the color chart for each paper type,
wherein the controller is configured to acquire the second characteristic information for each paper type based on the color chart for each paper type, and
wherein the controller is configured to generate a color profile for each paper type based on the first and second characteristic information for each paper type.

5. The apparatus according to claim 2,
wherein the at least one illumination apparatus comprises a plurality of illumination apparatuses, and the controller is configured to calculate combined information based on the information regarding each of the plurality of illumination apparatuses,
wherein the controller is configured to acquire the information regarding each of the plurality of illumination apparatuses via the network,
wherein the controller is configured to calculate the combined information based on the acquired information regarding each of the plurality of illumination apparatuses, and
wherein the controller is configured to acquire third characteristic information based on the calculated combined information.

6. The apparatus according to claim 5,
wherein the controller is configured to determine whether a color profile corresponding to the third characteristic information is stored in the storage,
wherein, in a case where the color profile corresponding to the third characteristic information is stored in the storage, the print controller is configured to perform the color conversion using the color profile corresponding to the third characteristic information stored in the storage, and
wherein, in a case where the color profile corresponding to the third characteristic information is not stored in the storage, the controller is configured to generate the color profile corresponding to the third characteristic information.

7. The apparatus according to claim 1, wherein the user interface is configured to provide notification that the generation of the color profile is completed by the controller.

8. The apparatus according to claim 1, wherein the controller is configured to acquire the information regarding the at least one illumination apparatus from a transmission device via the network.

9. The apparatus according to claim 8,
wherein the information regarding the at least one illumination apparatus is a product number of the at least one illumination apparatus, and
wherein the controller is configured to acquire the first characteristic information based on the product number.

10. The apparatus according to claim 1, wherein the controller is configured to acquire the information regarding the at least one illumination apparatus from the at least one illumination apparatus via the network.

11. The apparatus according to claim 10,
wherein the information regarding the at least one illumination apparatus is spectral data, and
wherein the controller is configured to acquire the first characteristic information based on the spectral data.

12. The apparatus according to claim 1, wherein the first characteristic information is information indicating spectral data, a color temperature, color rendering, or brightness.

13. The apparatus according to claim 1, further comprising:
a reception interface configured to receive page description language (PDL) data; and
a circuit configured to generate intermediate data from the PDL data,
wherein the color conversion is performed on the intermediate data.

14. The apparatus according to claim 1, wherein the first or second characteristic information of the light source is acquired based on a color code.

15. A method for controlling an apparatus which comprises a user interface configured to receive a color profile generation instruction, the method comprising:
acquiring information regarding at least one illumination apparatus via a network after the user interface receives the color profile generation instruction;
acquiring first characteristic information of a light source based on the acquired information regarding the at least one illumination apparatus;
acquiring second characteristic information of the light source based on a color chart printed by the apparatus;
generating a color profile based on the first and second characteristic information; and
providing, in a case where the controller fails to acquire the information regarding the at least one illumination apparatus, a notification of information indicating a failure of the acquisition, and prompting input of the information regarding the at least one illumination apparatus,
wherein selection of a location from among a plurality of locations is further received by the user interface, and
wherein the at least one illumination apparatus is placed at the selected location, and the information regarding the at least one illumination apparatus is acquired via the network based on the selected location.

16. The method according to claim 15 further comprising performing color conversion on data using the generated color profile to generate image data for use in printing.

17. The method according to claim 15, wherein the first or second characteristic information of the light source is acquired based on a color code.

18. A non-transitory computer-readable storage medium storing a program for causing a computer to execute a method for controlling an apparatus which comprises a user interface configured to receive a color profile generation instruction, the method comprising:

acquiring information regarding at least one illumination apparatus via a network after the user interface receives the color profile generation instruction;

acquiring first characteristic information of a light source based on the acquired information regarding the at least one illumination apparatus;

acquiring second light source characteristic information of the light source based on a color chart printed by the apparatus;

generating a color profile based on the first and second characteristic information; and providing, in a case where the controller fails to acquire the information regarding the at least one illumination apparatus, a notification of information indicating a failure of the acquisition, and prompting input of the information regarding the at least one illumination apparatus, wherein selection of a location from among a plurality of locations is further received by the user interface, and wherein the at least one illumination apparatus is placed at the selected location, and the information regarding the at least one illumination apparatus is acquired via the network based on the selected location.

19. The non-transitory computer-readable storage medium according to claim 18, the method further comprising performing color conversion on data using a color profile to generate image data for use in printing.

20. The non-transitory computer-readable storage medium according to claim 18, wherein the first or second characteristic information of the light source is acquired based on a color code.

* * * * *